(12) United States Patent
     Zhang

(10) Patent No.: US 11,790,587 B2
(45) Date of Patent: Oct. 17, 2023

(54) ANIMATION PROCESSING METHOD AND APPARATUS, COMPUTER STORAGE MEDIUM, AND ELECTRONIC DEVICE

(71) Applicant: Tencent Technology (Shenzhen) Company Limited, Shenzhen (CN)

(72) Inventor: Rong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 74 days.

(21) Appl. No.: 17/578,345

(22) Filed: Jan. 18, 2022

(65) Prior Publication Data

US 2022/0139020 A1    May 5, 2022

Related U.S. Application Data

(63) Continuation of application No. PCT/CN2020/125938, filed on Nov. 2, 2020.

(30) Foreign Application Priority Data

Jan. 15, 2020 (CN) .......................... 202010043321.5

(51) Int. Cl.
  *G06T 13/40* (2011.01)
  *A63F 13/52* (2014.01)
  *A63F 13/655* (2014.01)

(52) U.S. Cl.
  CPC ............... *G06T 13/40* (2013.01); *A63F 13/52* (2014.09); *A63F 13/655* (2014.09);
  (Continued)

(58) Field of Classification Search
  CPC .......... G06N 3/045; G06N 3/08; G06N 3/006; A63F 13/55; A63F 13/67; A63F 13/573;
  (Continued)

(56) References Cited

U.S. PATENT DOCUMENTS 10,096,125 B1 * 10/2018 Yang ....................... G06T 7/246
2013/0127873 A1    5/2013 Popovic et al.
(Continued)

FOREIGN PATENT DOCUMENTS

CN    102426709 A    4/2012
CN    103514622 A    1/2014
(Continued)

OTHER PUBLICATIONS

Extended European Search Report and Supplementary Search Report, EP20913359.4, dated Nov. 18, 2022, 19 pgs.
(Continued)

*Primary Examiner* — Xilin Guo
(74) *Attorney, Agent, or Firm* — Morgan, Lewis & Bockius LLP

(57) ABSTRACT

An animation processing method is performed by an electronic device. The method including: obtaining a terrain feature in a graphical user interface at a current moment, the graphical user interface including a virtual character, and obtaining state information and task information that correspond to the virtual character in an animation segment at the current moment; performing feature extraction on the terrain feature, the state information, and the task information using an animation processing model, to obtain joint action information corresponding to the virtual character at a next moment; determining a joint torque according to the joint action information; and obtaining gesture adjustment information corresponding to the virtual character from the current moment to the next moment based on the joint torque, and updating the animation segment according to the gesture adjustment information to render the updated animated segment in the graphical user interface.

20 Claims, 13 Drawing Sheets

(52) U.S. Cl.
CPC . *A63F 2300/6607* (2013.01); *A63F 2300/695* (2013.01); *G06T 2200/24* (2013.01)

(58) Field of Classification Search
CPC ............ A63F 2300/6607; A63F 13/655; A63F 13/52; A63F 2300/695; G06T 13/40; G06T 2200/24
See application file for complete search history.

(56) References Cited

U.S. PATENT DOCUMENTS

| | | | | |
|---|---|---|---|---|
| 2018/0089553 | A1* | 3/2018 | Liu | G06N 3/008 |
| 2019/0381404 | A1* | 12/2019 | Buttner | G06T 13/00 |
| 2021/0375021 | A1* | 12/2021 | Starke | G06N 3/047 |
| 2022/0230376 | A1* | 7/2022 | Rozantsev | H04N 19/537 |

FOREIGN PATENT DOCUMENTS

| | | | |
|---|---|---|---|
| CN | 106600668 | A | 4/2017 |
| CN | 108182719 | A | 6/2018 |
| CN | 108803615 | A | 11/2018 |
| CN | 110516389 | A | 11/2019 |
| CN | 111292401 | A | 6/2020 |
| JP | 2000508804 | A | 7/2000 |
| JP | 2004030502 | A | 1/2004 |
| JP | 2019175266 | A | 10/2019 |
| WO | WO 2006008491 | A1 | 1/2006 |

OTHER PUBLICATIONS

Doo Re Song et al., "Recurrent Deterministic Policy Gradient Method for Bipedal Locomotion on Rough Terrain Challenge", 2018 15th International Conference on Control, Automation, Robotics and Vision, (ICARCV), IEEE, Nov. 18, 2018, XP033480873, 8 pgs.

Xue Bin Peng et al., "DeepLoco: Dynamic Locomotion Skills Using Hierarchical Deep Reinforcement Learning", ACM Transactions on Graphics, ACM, NY, US, vol. 36, No. 4, Jul. 20, 2017, XP058372815, 13 pgs.

Xue Bin Peng et al., "Terrain-Adaptive Locomotion Skills Using Deep Reinforcement Learning", ACM Transactions on Graphics, ACM, NY, vol. 35, No. 4, Jul. 11, 2016, XP058275765, 12 pgs.

Eng-Jon Ong et al., "Learnt Inverse Kinematics for Animation Synthesis", Sep. 2006, 9 pgs., Retrieved from the Internet: https://www.researchgate.net/publication/223481731_Learnt_inverse_kinematics_for_animation_synthesis.

Jianjun Zhao et al., "Survey of Physics-Based Character Animation", Journal of Computer Research and Development, Dec. 15, 2015, 10 pgs.

Shujuan Peng et al., "Recent Advances in Deep Learning Model for Human Motion Generation", Journal of Computer-Aided Design & Computer Graphics, vol. 30, No. 6, Jun. 2018, 11 pgs.

Tencent Technology, ISR, PCT/CN2020/125938, Feb. 5, 2021, 2 pgs.

Tamer Wasfy et al., "Computational Strategies for Flexible Multibody Systems", Applied Mechanics Reviews, Aug. 2003, Retrieved from the Internet: https://www.researchgate.net/publication/228603822_Computational_strategies_for_flexible_multibody_systems.

Tencent Technology, IN Office Action, Indian Patent Application No. 202237015463, Aug. 22, 2022, 6 pgs.

Tencent Technology, WO, PCT/CN2020/125938, Feb. 5, 2021, 4 pgs.

Tencent Technology, IPRP, PCT/CN2020/125938, Jul. 19, 2022, 5 pgs.

Ken Tsutsuguchi et al., "Human Walking Animation System in Three-dimensional Modeled Scene", Information Processing Society of Japan, vol. 38, No. 4, Information Processing Society of Japan, Apr. 1997, vol. 38, No. 787-79, 11 pgs.

Ken Tsutsuguchi et al., "Terrain Adaptive Human Walking Animation", Systems and Computers in Japan, 1995, vol. 26, Issue 5, 4 pgs.

Tencent Technology, Japanese Office Action, JP Patent Application No. 2022-521969, dated Jun. 6, 2020, 7 pgs.

\* cited by examiner

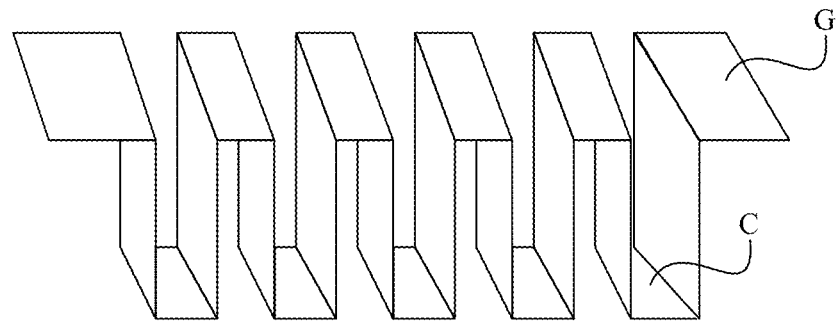
FIG. 5
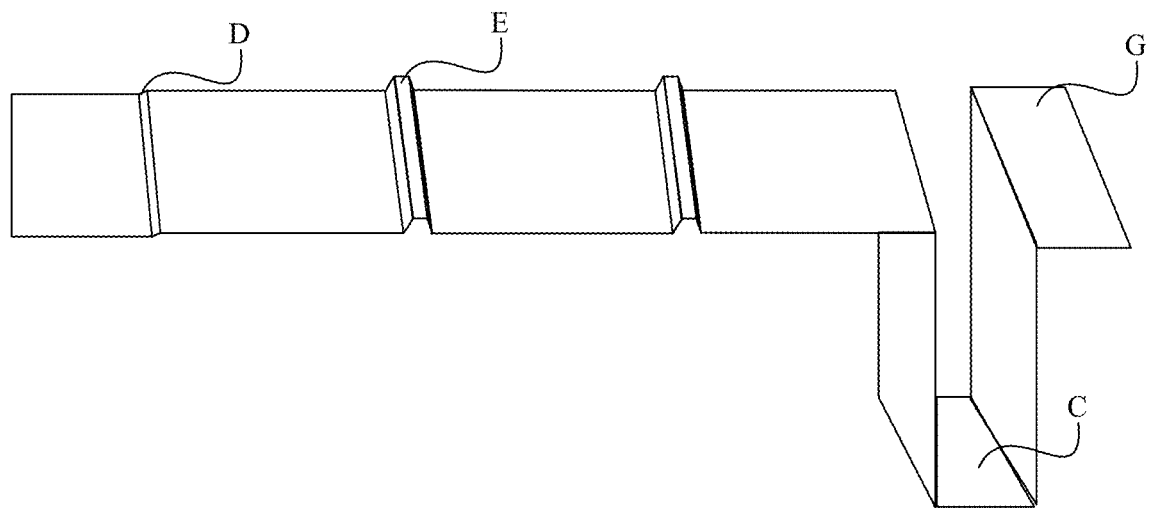
FIG. 6
```
{
"Frames":
[
[0.0333333, 001389296, 0.8033880000000001, 0.0036694320000000002,
0.5306733251792894, -0.5324986777087051, -0.4638864011202557, -0.46865807049205305,
0.7517762842400346, 0.0012912812309982618, -0.0033740637622359164,
0.6594083459744481,...],
....
]
}
```
FIG. 7

ANIMATION PROCESSING METHOD AND APPARATUS, COMPUTER STORAGE MEDIUM, AND ELECTRONIC DEVICE

CROSS-REFERENCE TO RELATED APPLICATIONS

This application is a continuation application of PCT Patent Application No. PCT/CN2020/125938, entitled "ANIMATION PROCESSING METHOD AND APPARATUS, AND COMPUTER STORAGE MEDIUM AND ELECTRONIC DEVICE" filed on Nov. 2, 2020, which claims priority to Chinese Patent Application No. 202010043321.5, filed with the State Intellectual Property Office of the People's Republic of China on Jan. 15, 2020, and entitled "ANIMATION PROCESSING METHOD AND DEVICE COMPUTER STORAGE MEDIUM AND ELECTRONIC EQUIPMENT", all of which are incorporated herein by reference in their entirety.

FIELD OF THE TECHNOLOGY

The present disclosure relates to the field of artificial intelligence technologies, and in particular, to an animation processing method, an animation processing apparatus, a computer storage medium, and an electronic device.

BACKGROUND OF THE DISCLOSURE

With the continuous development of artificial intelligence, artificial intelligence technologies start to be applied to more and more fields such as the medical field, the financial field, and the graphic design field. For example, game design gradually develops from the original 2D game design to the current 3D game design.

At present, in the game production, a plurality of animation segments are generally designed by an animator, the plurality of animation segments are then mixed and switched using a game engine, and an effect in a game is finally achieved. An animation is an expression of a character behavior, and a complete animation segment is that actions of a character object in a time period are recorded and played. However, an animation produced by the animator has a playing effect less natural and vivid than that of an animation rendered in real time in a physical engine, and cannot interact with a player, for example, cannot implement a variable target task, and cannot adapt to a dynamic terrain.

Information disclosed in the foregoing background is merely used for strengthening understanding of the background of the present disclosure, and therefore may include information that does not constitute the related art known to a person of ordinary skill in the art.

SUMMARY

Embodiments of the present disclosure provide an animation processing method, an animation processing apparatus, a non-transitory computer storage medium, and an electronic device.

The embodiments of the present disclosure provide an animation processing method performed by an electronic device. The method including: obtaining a terrain feature in a graphical user interface at a current moment, the graphical user interface including a virtual character, and obtaining state information and task information that correspond to the virtual character in an animation segment at the current moment; inputting the terrain feature, the state information, and the task information to an animation processing model, and performing feature extraction on the terrain feature, the state information, and the task information using the animation processing model, to obtain joint action information corresponding to the virtual character at a next moment; determining a joint torque according to the joint action information and obtaining gesture adjustment information corresponding to the virtual character from the current moment to the next moment based on the joint torque, and updating the animation segment according to the gesture adjustment information to render the updated animated segment in the graphical user interface.

The embodiments of the present disclosure provide a non-transitory computer-readable storage medium storing one or more computer programs, the one or more computer programs, when executed by a processor of an electric device, implementing the animation processing method according to the foregoing embodiments.

The embodiments of the present disclosure provide an electronic device, including one or more processors; and memory, configured to store one or more programs, the one or more programs, when executed by the one or more processors, causing the electronic device to implement the animation processing method according to the foregoing embodiments.

In technical solutions provided in the embodiments of the present disclosure, a terrain feature in a graphical user interface at a current moment and state information and task information that correspond to a virtual character in an animation segment at the current moment are first obtained; feature extraction is then performed on the terrain feature, the state information, and the task information using an animation processing model, to obtain joint action information corresponding to the virtual character at a next moment; and finally a joint torque is determined according to the joint action information, gesture adjustment information corresponding to the virtual character at the current moment is obtained based on the joint torque, and the animation segment is processed according to the gesture adjustment information. In this way, not only the animation segment can be simulated, but also an action and a gesture of the virtual character can be adjusted according to different terrain features and task information. On the one hand, fidelity of an animation is improved; on the other hand, interaction between a user and the virtual character is implemented, and self-adaptivity of the virtual character is improved.

It should be understood that the above general descriptions and the following detailed descriptions are merely for exemplary and explanatory purposes, and cannot limit the present disclosure.

BRIEF DESCRIPTION OF THE DRAWINGS

Accompanying drawings herein are incorporated into this specification and constitute a part of this specification, show embodiments that conform to the present disclosure, and are used for describing a principle of the present disclosure together with this specification. Apparently, the accompanying drawings described below are merely some embodiments of the present disclosure, and a person of ordinary skill in the art may further obtain other accompanying drawings according to the accompanying drawings without creative efforts. In the accompanying drawings:

FIG. 5 schematically shows a schematic diagram of an interface of a densely-notched terrain according to an embodiment of the present disclosure.

FIG. 6 schematically shows a schematic diagram of an interface of a hybrid-obstacle terrain according to an embodiment of the present disclosure.

FIG. 7 schematically shows action information of a first frame of a walking action of a human-shaped character according to an embodiment of the present disclosure.

DESCRIPTION OF EMBODIMENTS

Exemplary implementations will now be described more thoroughly with reference to the accompanying drawings. However, the exemplary implementations may be implemented in various forms, and are not to be understood as being limited to the examples described herein. Instead, the implementations are provided to make the present disclosure more thorough and complete and fully convey the idea of the exemplary implementations to a person skilled in the art.

In addition, the described features, structures or characteristics may be combined in one or more embodiments in any appropriate manner. In the following descriptions, many details are provided to obtain a thorough understanding of the embodiments of the present disclosure. However, a person of ordinary skill in the art is to be aware that, the technical solutions in the present disclosure may be implemented without one or more of the particular details, or another method, unit, apparatus, or step may be used. In other cases, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
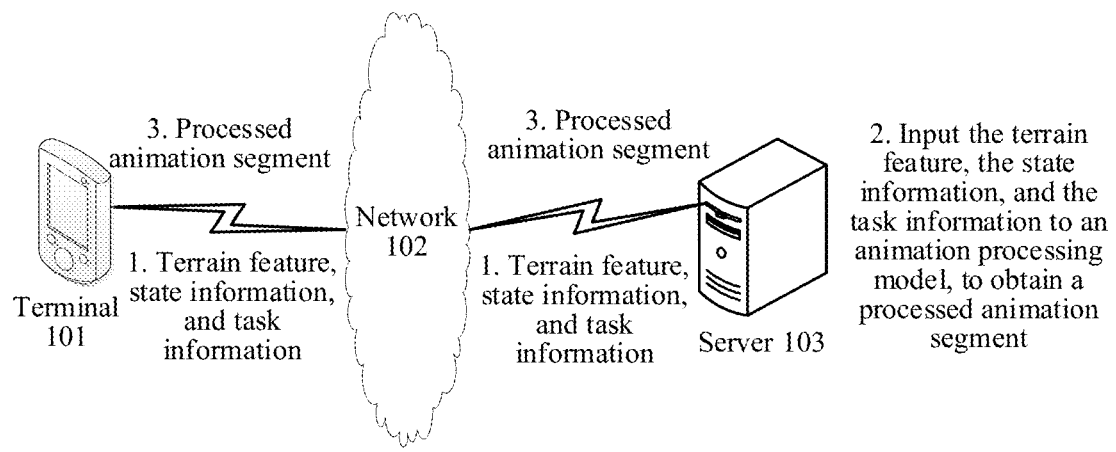
FIG. 1 is a schematic diagram of an exemplary system architecture to which technical solutions of embodiments of the present disclosure are applicable.

FIG. 1 is a schematic diagram of an exemplary system architecture to which technical solutions of embodiments of the present disclosure are applicable.

As shown in FIG. 1, the system architecture 100 may include a terminal device 101, a network 102, and a server 103. The network 102 is a medium used for providing a communication link between the terminal device 101 and the server 103. The network 102 may include various connection types, for example, a wired communication link, a wireless communication link, and the like.

It should be understood that the number of terminal devices, the number of networks, and the number of servers in FIG. 1 are merely exemplary. According to an actual requirement, there may be any number of terminal devices, any number of networks, and any number of servers. For example, the server 103 may be a server cluster including a plurality of servers. The terminal device 101 may be a terminal device including a display screen, such as a notebook, a portable computer, or a desktop computer.

In an embodiment of the present disclosure, a game application is carried in the terminal device 101, and the game application includes an animation segment. During running of the game application, an obstacle may be set for a virtual character using an associated control in the game application; or a real scene may be photographed using a photographing unit in the terminal device 101, and the real scene is integrated into a game screen to set an obstacle for the virtual character. Meanwhile, a user may set a task for the virtual character according to a scene in the animation segment, for example, cause the virtual character to move toward a target direction or a target point. The terminal device 101 may transmit a terrain feature in a graphical user interface at a current moment, and task information and state information that correspond to the virtual character in an animation segment at the current moment to the server 103 using the network 102, and the terrain feature, the task information, and the state information are processed using the server 103, to obtain gesture adjustment information corresponding to the virtual character at the current moment. In this way, not only the animation segment can be simulated, but also the virtual character can have self-adaptivity and can complete the set task.

In some embodiments, feature extraction may be performed on the terrain feature, the state information, and the task information using an animation processing model, to obtain joint action information corresponding to the virtual character at a next moment; and a joint torque may be determined based on the joint action information, and the joint torque may be applied to a corresponding joint using a physical engine to perform rendering, to obtain gesture adjustment information corresponding to the virtual character at the current moment. The state information corresponding to the virtual character may be gesture information corresponding to the virtual character at an initial moment of the animation segment, or may be state information determined based on joint action information at a previous moment. The animation segment has a certain duration, gesture adjustment information corresponding to the virtual character at a plurality of moments may be obtained by repeating the foregoing operations, a target action sequence may be determined according to the gesture adjustment information at the plurality of moments, the target action sequence may form an animation segment, the animation segment is similar to an animation segment in a game that is running and has higher fidelity, and a difference is that the virtual character in the animation segment may self-adapt to a terrain set by the user and complete the task set by the user, that is, the technical solution of the embodiments of the present disclosure can improve interaction between the user and the virtual character, and improve self-adaptivity of the virtual character, to further improve user experience.

The animation processing method provided in the embodiments of the present disclosure may be performed by a server, and correspondingly, the animation processing apparatus may be disposed in the server. However, in other embodiments of the present disclosure, the animation processing method provided in the embodiments of the present disclosure may be alternatively performed by a terminal device.

The server 103 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Figure 2:
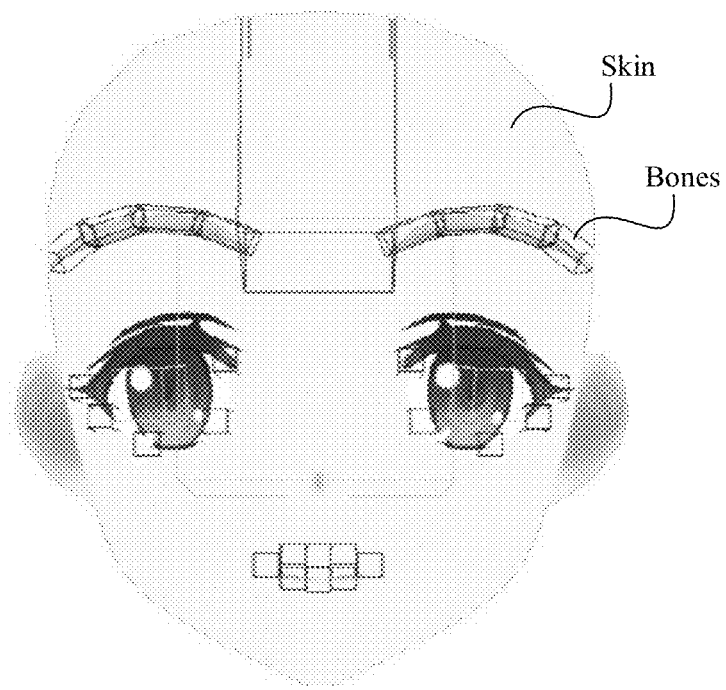
FIG. 2 schematically shows a composition structure of a virtual character in a skinned animation in the related art.

In the related technologies in this field, a 3D game is used as an example, a character animation in the 3D game usually refers to a skinned animation. FIG. 2 shows a composition structure of a virtual character in a skinned animation. As shown in FIG. 2, the virtual character in the skinned animation includes bones, skin, and an animation, where the bones are a movable skeleton that is constructed out of joints and that is a movable virtual subject, and drives the entire character to move, but is not rendered in the game; the skin is a triangular mesh wrapped around the bones, and each vertex of the mesh is controlled by one or more bones; and the animation is that a position or a direction of each of the bones at a certain time point changes, and three-dimensional space is usually represented by a matrix. Generally, an animator designs and produces a large quantity of animation segments using 3D animation production software in advance, and during playing of a game, a program plays a scene-required animation segment at an appropriate time. If especially necessary, animation post-processing is performed by the program before rendering, for example, accurate positions of hands and feet of the virtual character are calculated according to an actual environment at that time using an inverse kinematics (IK) method, to adjust an action. However, an effect of the post-processing is limited, and generally, the quality of an animation almost entirely depends on the skill of the animator. To directly produce an animation by an animator is actually to directly play the animation in a game, and is lack of simulation of a physical law in the real world by a physical engine, and therefore, an action of a character is not sufficiently natural or vivid. At present, there are some machine learning solutions in the industry, to train physical animation AI. However, the learning effect is usually poor, and one model can only learn one action, which has a single performance.

In addition, in modern game production, a main method for realizing an animation is to play an animation segment produced by an animator, is substantially merely applicable to enumerable scenes that are predefined, and does not possess an ability to self-adapt to an environment. The self-adaptivity to an environment of a character means that, in an unknown environment, a character animation can present a gesture matching the environment. The "unknown" herein is relative to an environment assumed during pre-production of an animation: An actual environment has a big or a small change during use of an animation segment. In addition, collision may be perceived under external interference, to present deviation and modification of an action, which has a strong sense of reality. At least the IK technology is needed to realize the self-adaptivity to an environment, to enable extremities of a character to be aligned with an environment or a target in terms of a position; and "physical" (that is, simulation of rigid body dynamics) further needs to be introduced if feedback of the character for the environment needs to be vivid, to calculate a proper speed and a smooth transition process of an action of the character. Generally, the terrain is fixed, an action process of the character moving on the terrain is produced into an animation, and appropriate modifications are performed on an unnatural part. This procedure is essentially still to play the animation, and the movement of the character on the terrain is unnatural.

In view of the existing problem in the related art, the embodiments of the present disclosure provide an animation processing method. The method is implemented based on artificial intelligence (AI). AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the functions of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, machine learning/deep learning, and the like.

Computer vision (CV) is a science that studies how to enable a machine to "see", and to be specific, to implement machine vision such as recognition, tracking, measurement, and the like for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

ML is a multi-field interdiscipline and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of the present disclosure involve image processing technologies of AI, and are described using the following embodiments.

Figure 3:
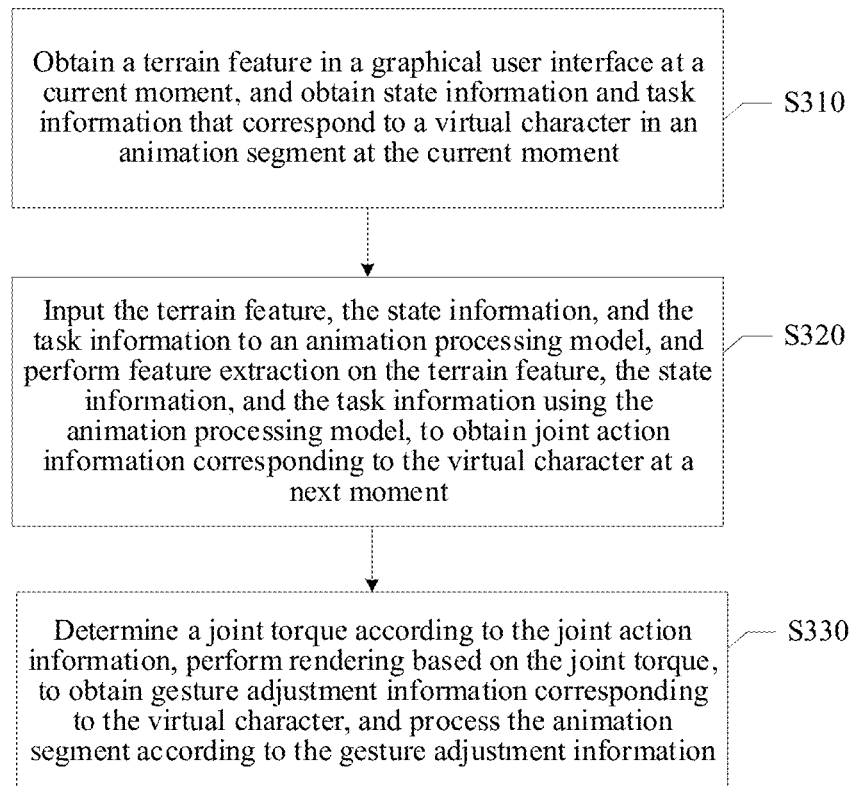
FIG. 3 schematically shows a schematic flowchart of an animation processing method according to an embodiment of the present disclosure.

The embodiments of the present disclosure first provide an animation processing method. FIG. 3 schematically shows a flowchart of an animation processing method according to an embodiment of the present disclosure. The animation processing method may be performed by a server, and the server may be the server 103 shown in FIG. 1. Processing of a game animation is used as an example. Referring to FIG. 3, the animation processing method includes at least step S310 to step S330.

In step S310: a terrain feature in a graphical user interface at a current moment is obtained, and state information and task information that correspond to a virtual character in an animation segment at the current moment are obtained. In some embodiments, the graphical user interface includes the virtual character that is to move around in the graphical user interface.

In an embodiment of the present disclosure, to improve interestingness of a game and strengthen interaction between a user and the virtual character in the game, during a game, the user may artificially set an obstacle for the virtual character, to form a new terrain in the graphical user interface, for example, when the virtual character walks straight forward along a level road in an original animation segment, the user may set a roadblock on a moving path of the virtual character, and the roadblock may be an obstacle such as a stone, a step, or a pit; or, the user may set an obstacle in the sky, for example, an obstacle such as an eave or a flying bird on the moving path of the virtual character, and the virtual character needs to avoid these obstacles to keep going forward. To make the technical solutions of the embodiments of the present disclosure clear, the following description takes a roadblock as an example, and the roadblock may be an obstacle such as a notch, a protuberance, or a step on ground.

Figure 4:
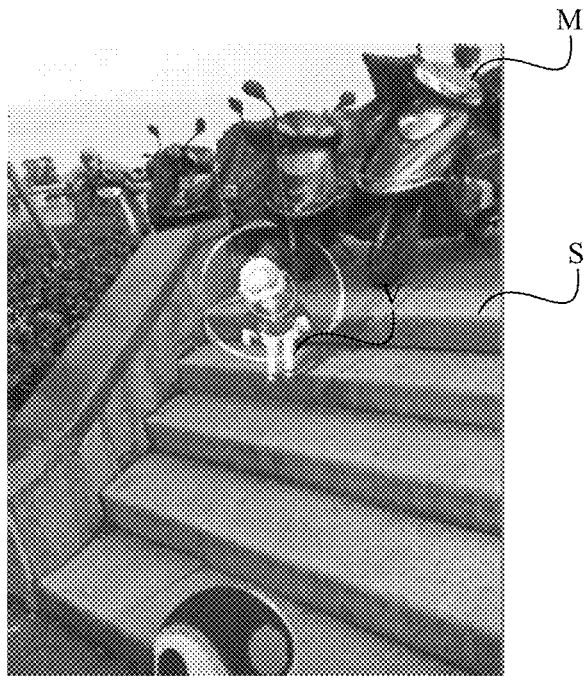
FIG. 4 schematically shows a schematic diagram of a scene obtained after a game scene and a real scene are integrated according to an embodiment of the present disclosure.

In an embodiment of the present disclosure, the roadblock set by the user may be set by using a control disposed inside a game, or may be set according to a real scene. In some embodiments, a roadblock setting button may be set in a game interaction interface. In a case that the user triggers the roadblock setting button, a list may pop up, and the user selects a roadblock that is intended to be set for the virtual character from the list. After determining of the user, the corresponding roadblock appears in the game interface. In an augmented reality game, the real scene is photographed by using a photographing unit carried by a terminal device used by the user, and a game engine may integrate the real scene and the game scene. FIG. 4 shows a schematic diagram of a scene obtained after a game scene and a real scene are integrated. As shown in FIG. 4, there is a demon spirit V in the game scene, there are a plurality of steps S in the real scene, and there are a plurality of electric scooters M arranged on a platform of the topmost step. The demon spirit V may be placed on a step S in the real scene by integrating the game scene and the real scene.

In an embodiment of the present disclosure, to set an obstacle in a game is usually to set a roadblock, and terrains generated using a relatively large number of obstacles include a densely-notched terrain and a hybrid-obstacle terrain. FIG. 5 shows a schematic diagram of an interface of a densely-notched terrain. As shown in FIG. 5, the densely-notched terrain is such designed that there are a plurality of successive notches on ground G, widths of the notches are different, and there is a certain interval between two notches. FIG. 6 shows a schematic diagram of an interface of a hybrid-obstacle terrain. As shown in FIG. 6, the hybrid-obstacle terrain includes obstacles such as a notch C, a step D, and a protuberance E on ground G with a certain length. Heights and widths of the obstacles are different, and there is a certain interval between two obstacles.

In an embodiment of the present disclosure, in addition to setting a roadblock for the virtual character, a task may be further set for the virtual character during movement of the virtual character. For example, there is a football in front of the virtual character, the task may be set as "kicking the football", and a coordinate position of the football is used as a target point, to determine task information according to the target point. A target speed direction may be further set for the virtual character, to drive the virtual character to move in a certain direction, and task information may be determined according to the target speed direction.

In an embodiment of the present disclosure, a gesture and an action of the virtual character are associated with each other in continuous time and space. A human-shaped virtual character that is taking a step is used as an example, and if a right foot of the human-shaped virtual character lifts at a current moment, the right foot tends to land at a next moment. Therefore, determining of joint action information of the virtual character at a next moment needs to be based on processing of state information of the virtual character at a current moment, and the state information is used for describing a state of each joint of the virtual character, and may include a gesture, a speed, and a phase of the joint. Therefore, to determine how to change a gesture of the virtual character at a current moment to avoid an obstacle and complete a task, a terrain feature in a graphical user interface at the current moment and state information and task information that correspond to the virtual character at the current moment may be obtained, and corresponding gesture adjustment information is obtained by processing these pieces of information.

In an embodiment of the present disclosure, when producing an animation segment, an animator may set the animation segment in different formats; when state information of a virtual character in the animation segment is extracted, the format of the animation segment is first converted into a file in the FBX format or BVH format using some software (such as MotionBuilder or 3ds Max), and the state information is then extracted. In the actual implementation, when the current moment is an initial moment of the animation segment, the state information is determined according to gesture information of the virtual character at the initial moment of the animation segment, and during the implementation, the gesture information at the initial moment may be determined as the state information; and when the current moment is a non-initial moment of the animation segment, the state information is determined according to joint action information corresponding to the virtual character at a previous moment, and during the implementation, the joint action information corresponding to the virtual character at the previous moment may be determined as the state information.

In an embodiment of the present disclosure, a human-shaped virtual character is used as an example, and the human-shaped virtual character has a total of 15 joints, which are respectively a root joint, a chest, a neck, a right leg, a left leg, a right knee, a left knee, a right ankle, a left ankle, a right shoulder, a left shoulder, a right elbow, a left elbow, a right hand, and a left hand, where the root joint usually refers to a pelvic position and is marked as a root. Generally, bones and joints of the human-shaped virtual character are in a parent-child hierarchical structure. For example, the shoulder is a parent joint, the elbow is a child joint of the shoulder, and the wrist is a child joint of the elbow. A position of a child joint is obtained by performing a corresponding translation from a position of a parent joint. Therefore, there is no need to record position coordinates of a child joint, and the position coordinates of the child joint may be obtained provided that position coordinates of a topmost root joint are known and then a translation is performed according to sizes of the bones set by the animator during designing of an animation. For an action, gesture information of joints of the character is recorded in the animation segment, and provided that a position and rotation of each of the joints need are known, a current action of the virtual character may be constructed. In addition to the position and rotation of the root joint, corresponding rotation of other joints is recorded, to construct a current entire gesture of the virtual character. FIG. 7 shows action information of a first frame of a walking action of a human-shaped character. As shown in FIG. 7, the action information of the first frame is divided into three lines, the first number 0.0333333 of the first line represents the duration of the first frame in seconds, and the three subsequent numbers (001389296, 0.8033880000000001, and 0.0036694320000000002) are coordinates of the root joint of the first frame in three-dimensional space; the four numbers of the second line (0.5306733251792894, −0.5324986777087051, −0.4638864011202557, and −0.46865807049205305) are rotation information of the root joint of the first frame; the four numbers of the third line (0.7517762842400346, 0.0012912812309982618, −0.0033740637622359164, and 0.6594083459744481) are rotation of the first child joint corresponding to the root joint, and rotation information of the remaining child joints is omitted in FIG. 7. The rotation information is represented by a unit quaternion. A unit quaternion may be used for representing rotation in three-dimensional space and is equivalent to the three-dimensional orthogonal matrix and the Euler angle that are frequently used, but the problem of gimbal lock in the Euler angle representation is avoided. In a case that Cartesian coordinates of a point in three-dimensional space are (x, y, z), the point is represented by a pure quaternion (that is similar to a pure imaginary number, that is, a quaternion with a real component of 0) xi+yj+zk. The geometric meaning of i, j, or k may be understood as a type of rotation, where the rotation i represents rotation from the X-axis positive direction toward the Y-axis positive direction in an intersected plane of the X-axis and the Y-axis, the rotation j represents rotation from the Z-axis positive direction toward the X-axis positive direction in an intersected plane of the Z-axis and the X-axis, the rotation k represents rotation from the Y-axis positive direction toward the Z-axis positive direction in an intersected plane of the Y-axis and the Z-axis, and −i, −j, and −k respectively represent reverse rotation of the rotation i, the rotation j, and the rotation k.

In an embodiment of the present disclosure, state information inputted to an animation processing model may be a 197-dimensional vector, where a gesture included is 106 dimensions, a speed included is 90 dimensions, and a phase included is 1 dimension. In some embodiments, the gesture records the positions and rotation information of the 15 joints of the human-shaped character, where the position is represented by three-dimensional coordinates, and the rotation information is represented by a unit quaternion, which is 15*7=105 dimensions in total. In addition, a y-axis value of 1 dimension of coordinates of the root joint of the virtual character at the current moment further needs to be recorded, which is used for alignment with the world coordinate system. The speed records a linear speed and an angular speed of each joint, which are each represented by a vector with a length of 3 corresponding to the x-axis, y-axis, and z-axis speeds, and therefore there are 15*(3+3)=90 dimensions in total. The phase records a position of the current moment in a total time length of the animation segment, which is 1 dimension in total.

Figure 8:
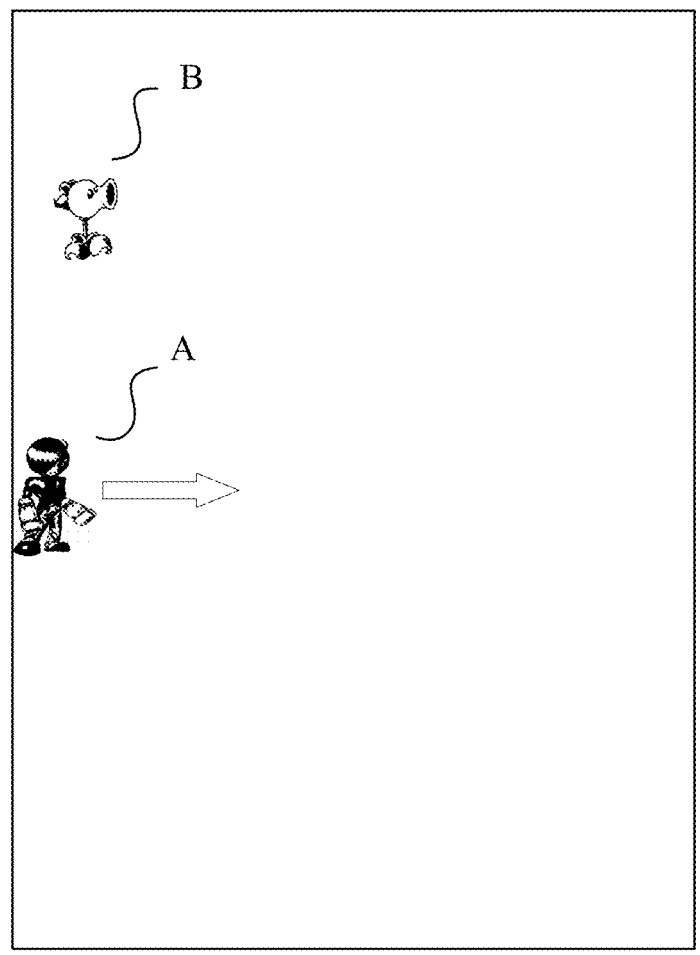
FIG. 8 schematically shows a schematic diagram of an interface of a terrain according to an embodiment of the present disclosure.

In an embodiment of the present disclosure, the terrain feature may be a two-dimensional matrix, each element of the matrix is a relative height difference between a terrain height at a corresponding point and a height of a current position of the virtual character, which covers a height of a region within a preset range in front of the virtual character. The size of the matrix and the area of the covering terrain may be adjusted according to an actual application scenario. For example, the size of the two-dimensional matrix is set as 100*100, and the area of the covering terrain is set as 10 m*10 m. This is not limited in the embodiments of the present disclosure. FIG. 8 shows a schematic diagram of an interface of a terrain. As shown in FIG. 8, the terrain is a rectangular region, a virtual character is located at a midpoint of a left sideline, and an arrow represents a movement direction of the virtual character A. Because the virtual character A merely moves forward in a horizontal direction without turning, and is parallel to and vertically as high as an obstacle B, the terrain feature may be determined as a matrix of 100*1, which covers a terrain feature within 10 m in front of the virtual character.

At the time of obtaining a terrain feature in a graphical user interface at a current moment and state information and task information that correspond to a virtual character in an animation segment at the current moment, the terrain feature, the state information, and the task information at the current moment transmitted by the terminal may be received, or the server itself determines the terrain feature, the state information, and the task information at the current moment according to the graphical user interface and received setting information.

In step S320: the terrain feature, the state information, and the task information are inputted to an animation processing model, and feature extraction is performed on the terrain feature, the state information, and the task information using the animation processing model, to obtain joint action information corresponding to the virtual character at a next moment.

In an embodiment of the present disclosure, after the terrain feature, the state information, and the task information at the current moment are obtained, these pieces of information may be inputted to the animation processing model, and feature extraction is performed on the terrain feature, the state information, and the task information using the animation processing model, to obtain joint action information corresponding to the virtual character at the next moment. The joint action information is information about an action that may be performed by each joint at a next moment when the virtual character faces the terrain feature and a task feature at the current moment, and the joint action information may be rotation information of a joint, which is represented as a 4-dimensional length and includes rotation information of joints other than the root joint, which is (15-1)*4=56 dimensions in total. A gesture of the root joint may be simulated and obtained by a physical engine after the other joints perform movement and rotation under a torque effect. For example, a human-shaped virtual character walks forward on flat ground, and after the physical engine performs the movement and rotation according to the torque determined by rotation information of joints such as legs and knees, a backward static friction force suffered by feet may be transferred successively to lower legs, knees, thighs, and till the root joint, and the root joint is pushed forward under the effect of the force, and therefore, action information of the root joint may be omitted in the joint action information.

Figure 9:
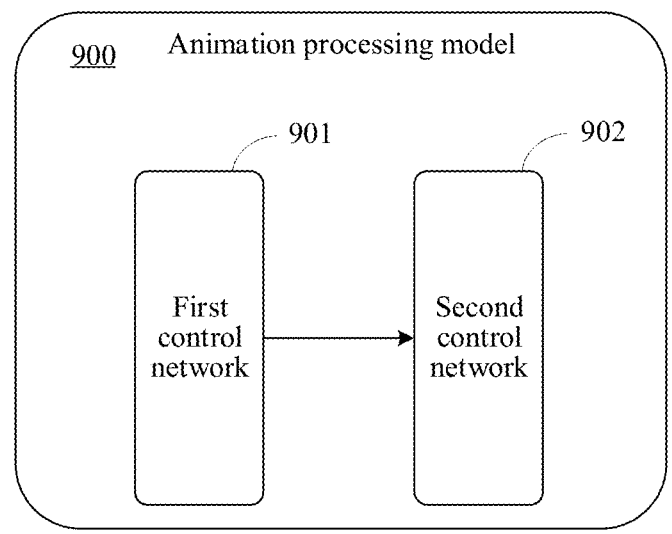
FIG. 9 schematically shows a schematic structural diagram of an animation processing model according to an embodiment of the present disclosure.

In an embodiment of the present disclosure, the feature extraction may be performed on the obtained terrain feature, state information, and task information using the animation processing model based on reinforcement learning, to obtain the joint action information corresponding to the virtual character at the next moment. FIG. 9 shows a schematic structural diagram of an animation processing model. As shown in FIG. 9, the animation processing model 900 includes a first control network 901 and a second control network 902. The first control network 901 may be a high-level controller (HLC), configured to guide action of key joints of the virtual character, the key joints are some joints corresponding to the terrain feature, and the state information and the task information of the virtual character. For example, when a human-shaped virtual character is running, an action of legs mainly changes, and thighs drive lower legs and feet to move, so that the key joints are the thigh joints. Similarly, when the human-shaped virtual character is throwing, an action of arms and hands mainly changes, elbows drive wrists and hands to move, so that the key joints are the elbows. The second control network 902 may be a low-level controller (LLC), configured to output joint action information corresponding to all joints. Adaptation to a complex animation scene and a complex task can be implemented better by setting respectively the first control network and the second control network. In addition, the first control network is mainly configured to guide a specific action, the second control network is mainly configured to control movement of a character. A plurality of first control networks for different specific actions may be connected to a trained second control network. For example, the trained second control network may output joint action information of a feet action of the virtual character according to target state information of feet, and an action corresponding to the target state of the feet may be an action of kicking a ball by the virtual character or an action of jumping by the virtual character. In this case, a same second control network may be connected to a first control network guiding the ball kicking of the virtual character, and also connected to a first control network guiding the jumping of the virtual character. The animation segment is processed using the animation processing model including the first control network and the second control network, which can improve an effect of an action and fidelity of the action, and can adapt to various terrains, to improve self-adaptivity to an environment.

In some embodiments, the first control network 901 performs the feature extraction on the terrain feature, and the state information and the task information that correspond to the virtual character at the current moment, to obtain target state information corresponding to the key joint; and then determines the target state information as target task information, and inputs the state information and the target task information to the second control network 902. The feature extraction is performed on the state information and the target task information that correspond to the virtual character using the second control network 902, to obtain the joint action information corresponding to all joints of the virtual character. Crossing an obstacle by a human-shaped virtual character is used as an example. In front of obstacles with different heights, to cause the human-shaped virtual character to cross successfully, the human-shaped virtual character lifts legs with different angles and takes steps with different sizes. The first control network 901 may output rotation of two thigh joints and a speed direction of the root joint on a plane of the character according to the terrain feature, the task information, and the state information, the rotation of two thigh joints and the speed direction of the root joint on the plane of the character being the target state information corresponding to the key joints, and the output is used as a target task of the second control network 902, to guide the human-shaped virtual character to lift legs. Correspondingly, the output of the first control network 901 may be a 10-dimensional vector, that is, a unit quaternion measuring the rotation of the two thighs and a unit vector with a length of 2. Certainly, in addition to being the rotation of two thigh joints and the speed direction of the root joint on the plane of the character, the target state information may be further rotation of two hand joints, rotation of two shoulder joints, or the like. The target state information is different according to different obstacle types and different task information.

Figure 10:
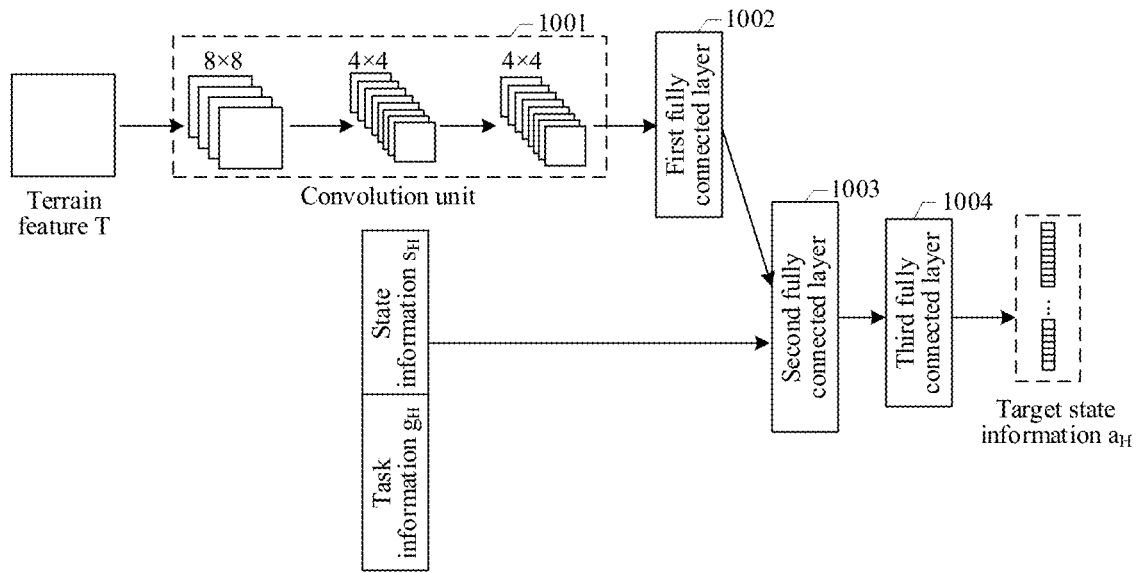
FIG. 10 schematically shows a schematic structural diagram of a first control network according to an embodiment of the present disclosure.

Further, FIG. 10 shows a schematic structural diagram of the first control network. As shown in FIG. 10, the first control network 901 includes a convolution unit 1001, a first fully connected layer 1002, a second fully connected layer 1003, and a third fully connected layer 1004, where the convolution unit 1001 may include a plurality of convolution layers of different sizes. As shown in the figure, a size of a first set of convolution layers is 8*8, sizes of both a second set of convolution layers and a third set of convolution layers are 4*4, and sizes of the first fully connected layer 1002, the second fully connected layer 1003, and the third fully connected layer 1004 are different from each other, where the numbers of nerve cells included in the first fully connected layer 1002, the second fully connected layer 1003, and the third fully connected layer 1004 are 64, 1024, and 512 respectively. After a terrain feature T, task information $g_H$, and state information $s_H$ are inputted to the first control network, feature extraction is first performed on the terrain feature T using the convolution unit 1001, to obtain first feature information corresponding to a terrain; feature combination is then performed on the first feature information using the first fully connected layer 1002, to obtain second feature information; feature combination is next performed on the second feature information, the state information $s_H$, and the task information $g_H$ using the second fully connected layer 1003, to obtain third feature information; and feature combination is finally performed on the third feature information using the third fully connected layer, to obtain target state information au.

Figure 11:
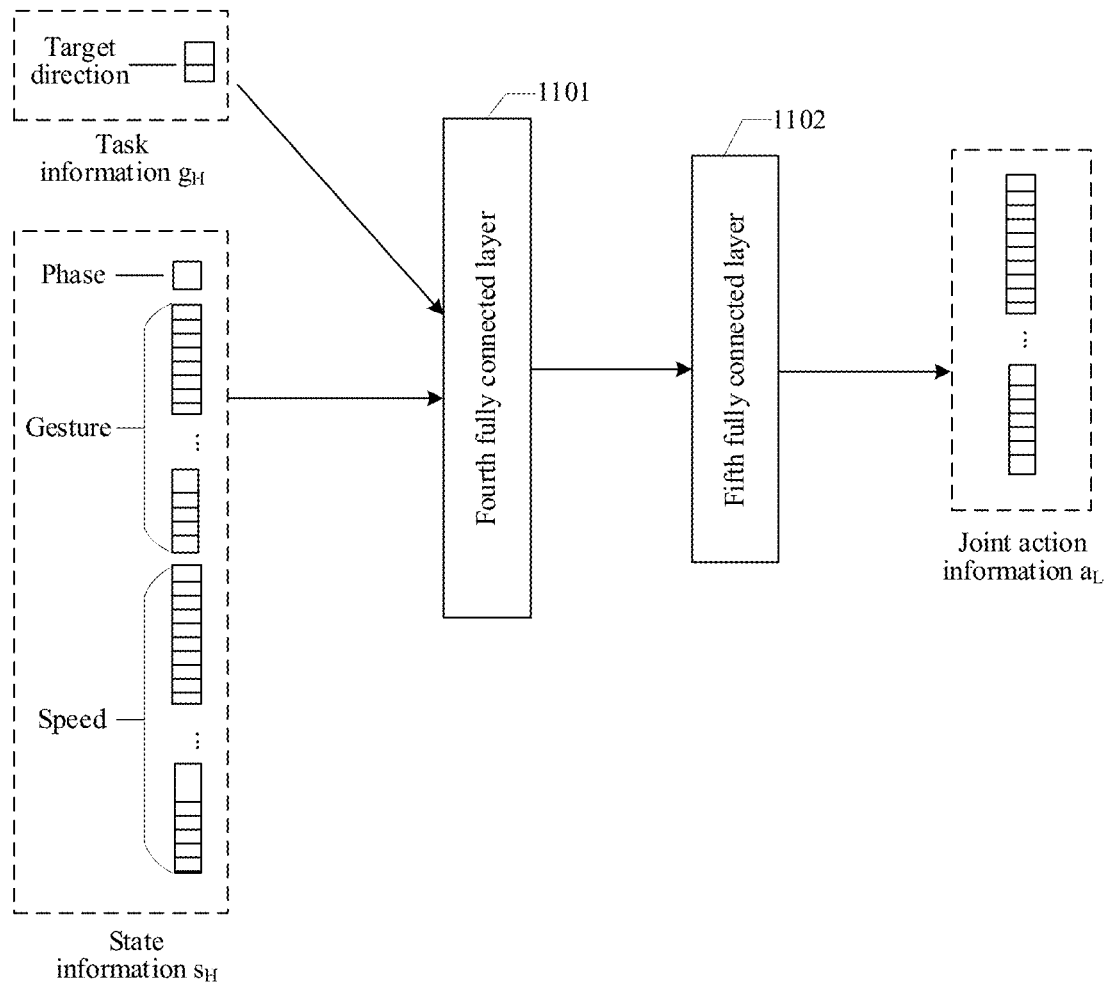
FIG. 11 schematically shows a schematic structural diagram of a second control network according to an embodiment of the present disclosure.

FIG. 11 shows a schematic structural diagram of the second control network. As shown in FIG. 11, the second control network 902 includes a fourth fully connected layer 1101 and a fifth fully connected layer 1102, and sizes of the fourth fully connected layer 1101 and the fifth fully connected layer are different. In some embodiments, the fourth fully connected layer 1101 may include 1024 nerve cells, and the fifth fully connected layer 1102 may include 512 nerve cells. After the first control network 901 outputs the target state information $a_H$, the target state information $a_H$ may be regarded as target task information $g_L$ of the second control network 902 and is simultaneously inputted along with state information $s_L$ to the second control network 902, feature combination is performed on the state information $s_L$ and the target task information $g_L$ using the fourth fully connected layer 1101, to obtain fourth feature information, and feature combination is then performed on the fourth feature information using the fifth fully connected layer 1102, to obtain joint action information $a_L$.

In an embodiment of the present disclosure, the first control network 901 guides the action of the key joint of the virtual character, that is, to guide a specific action, and the second control network 902 outputs the joint action information of all joints of the virtual character, to form a successive action, that is, to control movement of the character, and therefore, calling periods of the first control network 901 and the second control network 902 are different. That is to say, the first control network 901 needs to be called only when the action of the character or the state of the key joint changes; and as long as the virtual character is moving, each of the joints corresponds to corresponding joint action information, and therefore, the second control network 902 needs to be called constantly. Crossing a roadblock by a virtual character is used as an example. The first control network 901 needs to be called only when the virtual character steps, while the second control network 902 is called constantly, to control the virtual character to act successively. By setting different calling periods for the first control network 901 and the second control network 902, time and resources can be saved, to improve processing efficiency of an animation processing model, thereby improving efficiency of generating an action. In the embodiments of the present disclosure, a calling frequency of the first control network 901 is 2 Hz, a calling frequency of the second control network 902 is 30 Hz, and a physical simulation frequency is 3000 Hz for a PD controller. In the actual use, whether the first control network 901 needs to be called is determined according to the terrain feature, the task information, and the state information at the current moment. However, the second control network 902 needs to be called constantly to predict the joint action information of the virtual character at the next moment. In a case that the first control network 901 is not called, the input of the second control network 902 is unchanged.

In an embodiment of the present disclosure, before feature extraction is performed on the terrain feature, the state information, and the task information using the animation processing model, a to-be-trained animation processing model needs to be trained, to obtain a stable animation processing model. During the training of the animation processing model, a generally-adopted method is to input the terrain feature to the model. However, this method has a moderate effect, the training is easy to fail, and an action of the character is slightly stiff, and consequently this method adapts to only a relatively simple terrain. Therefore, in the embodiments of the present disclosure, the terrain feature inputted to the model is split, and hierarchical reinforcement learning is adopted, to strengthen sensitivity of the animation processing model to the terrain and the action, and to migrate to a more complex terrain. The reinforcement learning is a field of the machine learning, and emphasizes how to act based on an environment, to obtain a maximum expected benefit. The movement control problem becomes a standard benchmark of the reinforcement learning, and the deep reinforcement learning method is proved to adapt to a plurality of tasks including manipulation and movement.

Figure 12:
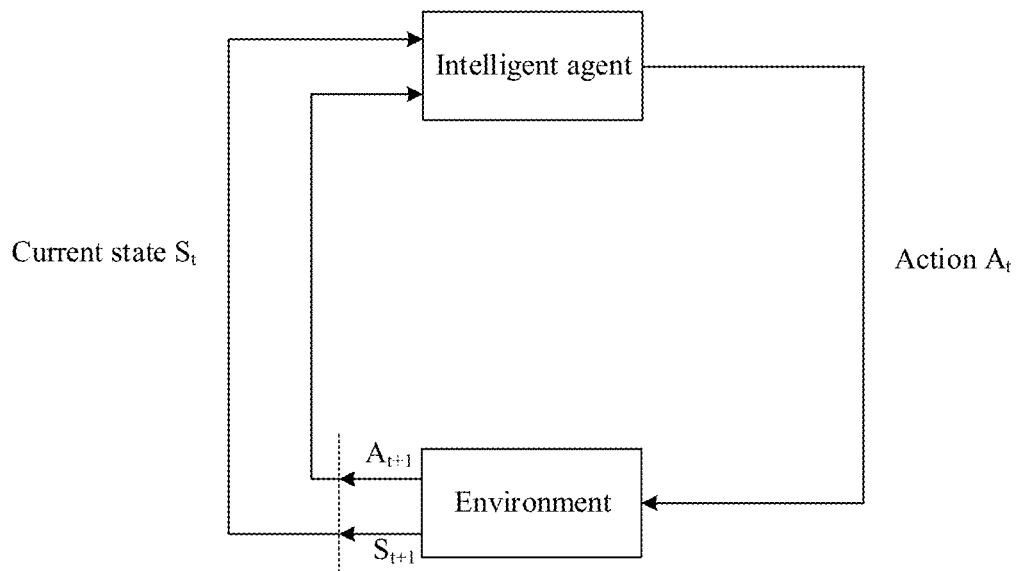
FIG. 12 schematically shows a schematic flowchart of reinforcement learning according to an embodiment of the present disclosure.

In an embodiment of the present disclosure, the reinforcement learning includes a plurality of basic concepts, which respectively are: an environment, an intelligent agent, a state, an action, a reward, a value function, and a policy. The environment is an external system, and the intelligent agent is located in the system and can perceive the system and can perform a certain action based on a perceived state. The intelligent agent is a system embedded into the environment and can perform an action to change the state. The state is state information of the current environment at a moment. The action is a behavior performed by a subject. The reward is a scalar, referring to a reward of the environment for a current action or state. The reward defines an immediate benefit, while the value function defines a long-term benefit, which can be regarded as a reward accumulated and usually represented by V. The policy is mapping from the current environment state to the behavior, which is usually represented by π, that is, an input state, and the model outputs an action needing to be performed in the state. FIG. 12 shows a schematic flowchart of the reinforcement learning. As shown in FIG. 12, at a moment t, a current state $S_t$ is inputted to the intelligent agent, and according to a current policy, the intelligent agent may output an action $A_t$; the action $A_t$ is performed to interact with the environment, and according to a completion condition of a target, the environment feeds back a reward $R_t$ and a state $S_{t+1}$ of the intelligent agent at a next moment t+1; the intelligent agent adjusts the policy according to the reward to output an action $A_{t+1}$ at the next moment; and this process is repeated, the policy is adjusted continuously, and a policy π being able to complete the target may be finally obtained by training.

Figure 13:
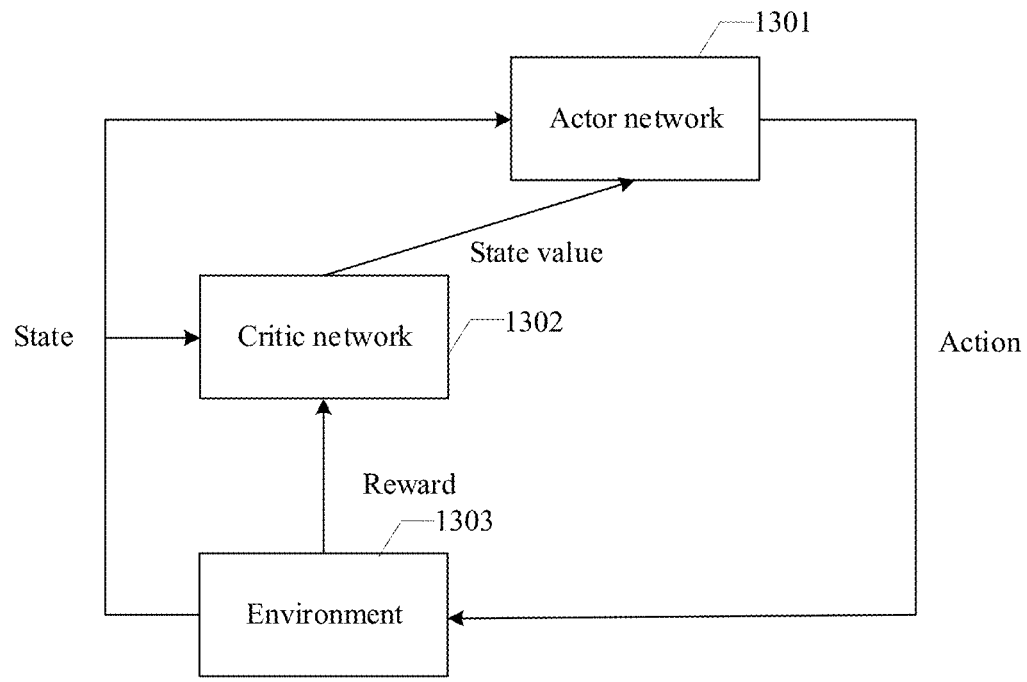
FIG. 13 schematically shows an architectural diagram of an algorithm framework of an animation processing model according to an embodiment of the present disclosure.

In an embodiment of the present disclosure, an animation processing model is trained based on an AC framework. The AC framework is a framework integrating a value function estimation algorithm and a policy search algorithm, and includes two networks: an actor network and a critic network. The actor network trains a current policy, and is configured to output an action; and the critic network learns a value function, and is configured to output a current state value V(s), and the value is used for evaluating quality of a state. FIG. 13 shows an architectural diagram of an algorithm framework of an animation processing model. As shown in FIG. 13, the framework includes an actor network 1301, a critic network 1302, and an environment 1303. The actor network 1301 outputs an action according to a current state and policy, the environment 1303 feeds back in a reward form according to the action outputted by the actor network 1301, and the critic network 1302 performs evaluation according to a state generated and the reward fed back by the environment 1303 after the action is performed, determines a current state value, and feeds back the current state value to the actor network 1301, to cause the actor network 1301 to adjust the policy. The process is repeated, and the training is continuously performed, till the animation processing model is stable. A learning standard of the current state value outputted by the critic network 1302 is obtained by calculating a series of rewards fed back by the environment 1303 using a temporal difference method, and is used for guiding learning of the critic network. In some embodiments, path simulation is used as an example, and rewards $R_1$ to $R_i$ corresponding to nodes on a path may be obtained, i being the number of the nodes on the path; when a state value $V(S_t)$ corresponding to a node t on the path is intended to be obtained, t being a value in a range of 1 to i, the value $V(S_t)$ of $S_t$ is updated according to the obtained reward R and an estimated value of the state value of a subsequent state. After updating is performed a plurality of times, a stable value function is obtained; and after sampling is performed on the path, the value function may be updated a plurality of times, and an evaluation algorithm used may be $V(S_t)=V(S_t)+\alpha(R_{t+1}+V(S_{t+1})V(S_t))$, $\alpha$ being a coefficient. The temporal difference method is the central idea of the reinforcement learning. Similar to the Monte Carlo method, the temporal difference method is combined with a sampling method (namely, performing an experiment) of the Monte Carlo method and bootstrapping (estimating a current value function using a value function of a subsequent state) of the dynamic programming method, and may directly learn from experience without complete knowledge of an environment. Similar to the dynamic programming method, the temporal difference method may improve an existing estimation result without waiting for completion of an entire event, thereby improving learning efficiency.

In an embodiment of the present disclosure, during training of the model, a physical engine includes two characters, which are a kinematics character and a physical character respectively. The kinematics character does not have a physical property, and is only used for performing an action in an action segment designed by an animation designer, and it is only needed to cause a joint of the kinematics character to perform a reference action in the animation segment using a kinematics method. The physical character learns by using the kinematics character as a standard and a template, and has a physical property, and may be controlled by a torque, the physical property may be a torque, a speed, gravity, a collision effect, or the like. Meanwhile, the physical character having a physical property calculates a torque of each joint using a gesture outputted by a model, and performs action simulation in a physical engine. The physical engine simulates a condition of the environment after each action is performed, which produces a real effect. At every moment, to calculate a reward is to measure a difference between current gestures, speeds, angular speeds, or the like of the two characters, and if the difference is smaller, the reward is bigger. A final reward is obtained by performing weighted summation on a plurality of reward components, and weights may be adjusted as required. The environment gives a reward according to quality of simulation of a gesture, to stimulate the character to keep a gesture consistent with the gesture of the reference action. If the two gestures are closer, the reward is bigger; otherwise, the reward is smaller.

In an embodiment of the present disclosure, the reward is determined according to a formula (1), and the formula (1) is as follows:

$$r_t = w_t^I r_t^I + w_t^G r_t^G \qquad (1)$$

$r_t^I$ is a reward value of simulation at a moment t, $r_t^G$ is a reward value of completing a target task at the moment t, a weight $w_t^I$ represents a proportion of simulating an action, a weight $w_t^G$ is a proportion of completing the task, and in engineering, $w_t^I=0.7$ and $w_t^G=0.3$ may be set, $(w_t^I, w_t^G)=(0.7, 0.3)$.

To cause actions of the physical character and the kinematics character to be consistent, some standards may be set to fit the physical character and the kinematics character, a formula $r_t^I$ involves similarities in terms of kinematics, including five parts: a gesture reward $r_t^p$, a speed reward an extremity joint reward $r_t^e$, a root joint gesture reward $r_t^r$, and a centroid gesture reward $r_t^c$. The gesture and the speed are a gesture and a speed of each of joints. If actions of the two characters need to be consistent, the gestures and the speeds need to be consistent necessarily, and therefore, a gesture reward and a speed reward may be set. Extremity joints refer to hands and feet. To cause extremity joints of the physical character to be aligned with extremity joints of the kinematics character, extremity joint rewards are set for the extremity joints. The root joint is a top joint of all joints. If actions of the two characters need to be consistent, the root joints also need to be consistent, and therefore, a root joint gesture reward may be set. In addition, to ensure that the physical character walks more steadily and does not shake, it needs to be ensured that a centroid of the physical character is kept consistent with a centroid of the kinematics character, and therefore, a centroid gesture reward may be set. By setting the foregoing rewards, it may be ensured that actions of the physical character and the kinematics character are consistent to the greatest extent. Weights corresponding to the rewards are $(w^p, w^v, w^e, w^r, w^c)=(0.5, 0.05, 0.15, 0.2, 0.1)$. A top right corner of an item of the kinematics character is marked with *. A gesture component is used as an example, where $q^*_j$ is a gesture of a $j_{th}$ joint of the kinematics character, and $q_j$ is a gesture of a $j_{th}$ joint of a simulation character. The formula (1) may be converted into a formula (2), shown as follows:

$$r_t^I = w^p r_t^p + w^v r_t^v + w^e r_t^e + w^r r_t^r + w^c r_t^c \qquad (2)$$

where $r_t^p$ describes a similarity between gestures, and is represented by a difference between a position and rotation and a target value of each of the joints, $$r_t^p = \exp\left[-2\left(\sum_j \|q_j^* - q_j\|^2\right)\right];$$

$r_t^v$ describes a similarity between speeds, and is represented by a difference between a linear speed and a target value of each of the joints, $$r_t^v = \exp\left[-0.1\left(\sum_j \|v_j^* - v_j\|^2\right)\right];$$

$r_t^e$ describes a similarity between extremity joint gestures, and is represented by a difference between a position of a hand joint and a position of a foot joint, $$r_t^e = \exp\left[-40\left(\sum_e \|p_j^{e*} - p_j^e\|^2\right)\right];$$

$r_t^r$ describes a similarity between root joints, $$r_t^r = \exp\left[-20(\|p_j^{r*} - p_j^r\|^2)\right];$$

$r_t^c$ describes a similarity between centroid speeds, $$r_t^c = \exp\left[-10(\|v_j^{c*} - v_j^c\|^2)\right].$$

$r_t^G$ describes quality of achieving a target by the character, and usually measures a difference between an actual condition and a target of movement of the character. For example, when the target is a movement direction $g_t$, $r_t^G$ may be calculated as an angle difference θ between a forward direction $v_t$ on ground and the target $g_t$, as shown in a formula (3):

$$r_t^G = \exp[-4(1-\cos\theta)] = \exp\left[-4\left(1 - \frac{v_t^T g_t}{\|v_t\|\|g_t\|}\right)\right], \text{ where } \theta \in [0, 3.14]. \quad (3)$$

In a case that the virtual character fails to learn an action of falling down, a current training path is completed, and a reward value is 0.

In an embodiment of the present disclosure, a to-be-trained animation processing model includes a first control network to be trained and a second control network to be trained. Before training, a plurality of animation segment samples may be obtained, the animation segment samples include different terrain features and different task information corresponding to the virtual character, and corresponding to the different terrain features and the different task information, the virtual character has different gestures and actions. Because the first control network of the animation processing model in the embodiments of the present disclosure outputs target state information corresponding to a key joint according to a terrain feature, task information, and state information, the target state information is then inputted as target task information to and is processed by the second control network to output joint action information, which may be used for processing a complex task. In a case that the first control network and the second control network are trained simultaneously and there is an error in target state information outputted by the first control network, the target state information with the error is inputted to the second control network, and the animation processing model is trained reversely according to joint action information outputted by the second control network, and therefore, the animation processing model is unstable, thereby failing to process a complex task efficiently. Therefore, to ensure that the animation processing model can process a complex task, the first control network to be trained and the second control network to be trained need to be trained separately during the training. To complete training of the first control network to be trained is to train a first control network to be trained connected to the second control network with a fixed parameter, to obtain the first control network.

In an embodiment of the present disclosure, the animation processing model is trained based on an AC algorithm framework, and the first control network to be trained and the second control network to be trained in the animation processing model are trained separately, and therefore, the first control network to be trained and the second control network to be trained may be set as each including a pair of AC networks, that is, the first control network to be trained includes a first to-be-trained actor sub-network and a first to-be-trained critic sub-network, and the second control network to be trained includes a second to-be-trained actor sub-network and a second to-be-trained critic sub-network. Further, a structure of the first to-be-trained actor sub-network may be set to be the same as that of the first to-be-trained critic sub-network, and a structure of the second to-be-trained actor sub-network may be set to be the same as that of the second to-be-trained critic sub-network. For the structures of the first to-be-trained actor sub-network and the first to-be-trained critic sub-network, reference may be made to FIG. 10, and for the structures of the second to-be-trained actor sub-network and the second to-be-trained critic sub-network, reference may be made to FIG. 11; and a difference merely lies in inputted information and outputted information. After the training of the first control network to be trained and the second control network to be trained is completed, the first actor sub-network and the second actor sub-network merely need to be called, to output the target state information $a_H$ corresponding to the key joint according to the inputted terrain feature, task information, and state information using the first actor sub-network, and further to output joint action information $a_L$ of all the joints of the virtual character according to the target state information and the state information using the second actor sub-network.

Avoiding a roadblock by a human-shaped virtual character is used as an example. During training of the second control network to be trained, the training may be performed on flat ground using an animation segment set. The animation segment set includes a plurality of animation segment samples, covering different gestures of leg lifting and stepping of the virtual character in front of obstacles of different heights. Initial actions are close and have only one step. For example, there are 15 animation segment samples in total in the animation segment set, and a length of each of the animation segment samples is 0.5 s. During the training, the most appropriate animation segment sample may be selected from the plurality of animation segment samples and trained.

After the animation segment set is obtained, mirroring may be performed on each of the animation segment samples, that is, stepping of a right leg of the character turns to stepping of a left leg, and stepping of a left leg of the character turns to stepping of a right leg, to achieve data reinforcement, and an initial gesture and a gesture of landing a foot of the character of each action segment are then counted. Because the second control network uses the output of the first control network as a target task, when the second control network to be trained is trained, an initial gesture of the virtual character may be preset, a target animation segment sample may be determined from the animation segment set according to the initial gesture, and a target task is determined according to the target animation segment sample, to cause the second control network to be trained to learn according to the target animation segment sample. In a case that the virtual character completes one step and is ready to start a next step, the foregoing operations may be repeated, and the target animation segment sample the same as or similar to the initial gesture is obtained, to train the second control network to be trained. In a case that the target animation segment sample is determined, an initial gesture may be compared with each of the animation segment samples in the animation segment set, to obtain a similarity between the initial gesture and a gesture of the virtual character of each of the animation segment samples, then a plurality of similarities are ranked in descending order to form a sequence, and an animation segment sample corresponding to a highest similarity is finally used as the target animation segment sample; or a preset number of similarities may be obtained successively from the sequence, any one of animation segment samples corresponding to the similarities is used as the target animation segment sample, and the preset number may be set according to an actual requirement, for example, the preset number may be 3 or 5. After the target animation segment sample is determined, a state information sample corresponding to the key joint is extracted from the target animation segment sample, the state information sample is used as the target task information, and joint action information samples corresponding to all joints of the virtual character are obtained simultaneously; and the target task information is then inputted to the second control network to be trained to perform training, and when the joint action information outputted by the second control network to be trained is the same as or similar to the joint action information samples, it indicates that the training of the second control network to be trained is completed. The joint action information samples may be rotation $h_0^k$ and rotation $h_1^k$ of two thighs of the kinematics character when landing a foot and a speed direction $\theta_{root}^k$ of the root joint on a plane, $h_0^k$ describes rotation of a landing foot corresponding to a thigh joint, $h_1^k$ describes rotation of a non-landing foot that is about to land/rotation of a landing foot corresponding to a thigh joint, and current target task information $g_L^k$ may be determined according to the rotation $h_0^k$ and the rotation $h_1^k$ of the two thighs and the speed direction $\theta_{root}^k$ of the root joint on the plane, and is inputted to the second control network to be trained to perform training.

To ensure stability of the second control network, training may be performed according to a plurality of running paths of the character, and a maximum value of the running paths of the character may be set as a numeric value such as 200s. The second control network to be trained based on reinforcement learning may evaluate an action or a state of the virtual character after the virtual character completes the running paths, determines a state value, and adjusts the action according to the state value, till the maximum state value is obtained. By training, when different target task information is inputted, the second control network may perform a corresponding stepping action.

In an embodiment of the present disclosure, after training of the second control network is completed, the first control network to be trained may be trained, and there is only one animation segment sample of running used for training, and the largest length of each of the paths may also be limited to 200 s. In a case that each of the paths is started, a terrain feature sample, a character state sample, and a task information sample at a current moment may be inputted, feature extraction is performed on the terrain feature sample, the character state sample, and the task information sample at the current moment using the first control network to-be-trained, and action information is outputted. The action information may be inputted as a target task to a trained second control network, and corresponding joint action information is outputted by the second control network, to control an action of the character. Similarly, after the virtual character completes the running paths, the first control network to be trained based on reinforcement learning may determine a state value corresponding to a state of the virtual character according to a reward fed back by an environment, and when the state value reaches a preset value or a maximum value, it indicates that training of the first control network to be trained is completed.

In step S330, a joint torque is determined according to the joint action information, gesture adjustment information corresponding to the virtual character is obtained from the current moment to the next moment based on the joint torque, and the animation segment is updated according to the gesture adjustment information. In some embodiments, the updated animation segment is rendered in the graphical user interface.

In an embodiment of the present disclosure, after the joint action information outputted by the animation processing model is obtained, a joint torque may be determined according to the joint action information, the joint torque may be further applied to a joint corresponding to a rigid body structure using the physical engine to perform rendering, to obtain the gesture adjustment information corresponding to the virtual character, and the animation segment is processed according to the gesture adjustment information.

In an embodiment of the present disclosure, in a motion animation, a character gesture is usually controlled using a method based on inverse kinematics. However, for control of a character gesture based on physics, when the kinematics method is used to control a character in real time, a real physical effect fails to be generated and a mutual effect such as collision fails to be perceived, and therefore, a torque is usually used to control a character action. There are mainly three methods for controlling a physical character in real time: (1) Torque control: a model directly outputs a torque applied to each joint. This method is easy to be implemented. However, the control effect is poor, dynamic control is unstable, shaking is easy to happen, and an action is not sufficiently natural. (2) Position control: a model provides a target position of each joint, and then a character is dynamically controlled to be in a corresponding position using a PD controller (proportional-derivative controller). Compared with the torque control, the position control is more stable, the model outputs a gesture of each joint, and the method has a relatively small distribution variance and small samples and a high model convergence speed. However, conventional PD control still has relatively large shaking. (3) Speed control: a model directly provides a target speed of each joint, the character is then controlled dynamically to be at the target speed using a PD control algorithm, and an effect and a model convergence speed of the speed control are substantially consistent with those of the position control.

However, a position controller is usually used, which is equivalent to hierarchical control, a decision network obtains a current character state, a target position at a next moment is outputted, the character is then controlled dynamically to be in a target gesture using the PD controller, and in actual engineering, a control period of the PD is set as 100. This method has fine effects in both the model convergence speed and the robustness. However, when a common PD controller is used, shaking is relatively large and a gesture is not very standard.

To overcome shortcomings of the existing gesture control method, the embodiments of the present disclosure provide stable PD control based on inverse kinematics. A calculation formula of determining a torque using a conventional PD controller is shown as a formula (4):

$$\tau^n = -k_p(q^n - \hat{q}^n) - k_d(\dot{q} - \dot{q}^n) \quad (4)$$

$\tau^n$ a torque output, q is a current position of a joint of a virtual character at a current moment, $\hat{q}$ is a target position of the joint of the virtual character, $\dot{q}$ is a speed of the joint at the current moment, $k_p$ is a proportional coefficient, $k_d$ is a derivative gain coefficient, and n is the number of control periods of PD control.

During control of a physical character, the controller needs to fast reduce a difference from a target gesture, and therefore, $k_p$ needs to be set to be larger. In this case, a stability problem of a high proportional gain is easy to happen. The stable PD control may well solve this problem. The stable PD control calculates and obtains $\tau^n$ using a position after a next time period $\delta t$, which is equivalent to a case that while a difference from a target is compared, an initial state is considered, thereby improving the stability of the physical character. In some embodiments, a current position and a target position of a joint are determined according to joint action information; a current speed and a current acceleration of the joint are determined according to the current position, and a target speed of the joint is determined according to the target position; a first position and a first speed that correspond to the joint after a next control period are determined according to the current speed and the current acceleration; and a joint torque is calculated according to the proportional coefficient, the derivative gain coefficient, the current position, the target position, the target speed, the first position, and the first speed. Reference is made to a formula (5) for a calculation formula:

$$\tau^n = -k_p(q^n + \delta t \dot{q}^n - \hat{q}^{n+1}) - k_d(\dot{q}^n + \delta t \ddot{q}^n - \dot{\hat{q}}^{n+1}) \quad (5)$$

$\tau^n$ is a torque output, $k_p$ is a proportional coefficient, $k_d$ is a derivative gain coefficient, $q^n$ is a current position, $\delta t \dot{q}^n$ is a first position of a joint at a current speed after a time period, $\hat{q}^{n+1}$ is a target position of the joint, $\dot{q}^n$ is the current speed of the joint, $\delta t \ddot{q}^n$ is a first speed of the joint at a current acceleration after a time period, $\dot{\hat{q}}^{n+1}$ is a target speed of the joint, and n is the number of control periods of a controller.

In an embodiment of the present disclosure, a plurality of torques corresponding to one piece of joint action information may be determined using stable PD control based on inverse kinematics, the plurality of torques are further applied to corresponding joints respectively using a physical engine, angular speeds and final gestures are calculated according to rotation axes and anchor points of the joints, and a real condition of the joint rotation is simulated, that is, gesture adjustment information corresponding to a virtual character at a current moment may be obtained, where the gesture adjustment information may be an action sequence. The stable PD control based on inverse kinematics can improve calculation accuracy, reduce shaking, and improve an action effect of the virtual character.

In an embodiment of the present disclosure, the foregoing solution is repeated in a successive time period, till simulation of an image of a last frame in an animation segment is completed, so that gesture adjustment information corresponding to a virtual character at each moment, that is, the gesture adjustment information corresponding to the virtual character in each image frame may be obtained, where the gesture adjustment information is about a gesture of the virtual character determined according to a newly-added terrain feature in a graphical user interface and a set task feature corresponding to the virtual character. A target action sequence may be determined according to the gesture adjustment information corresponding to the virtual character at each moment. From the user's perspective, an animation effect presented by the target action sequence is more vivid than an effect of an original animation segment, the virtual character may avoid a newly-set obstacle and complete a corresponding task, the animation effect is more vivid, and the user experience is better.

Figure 14:
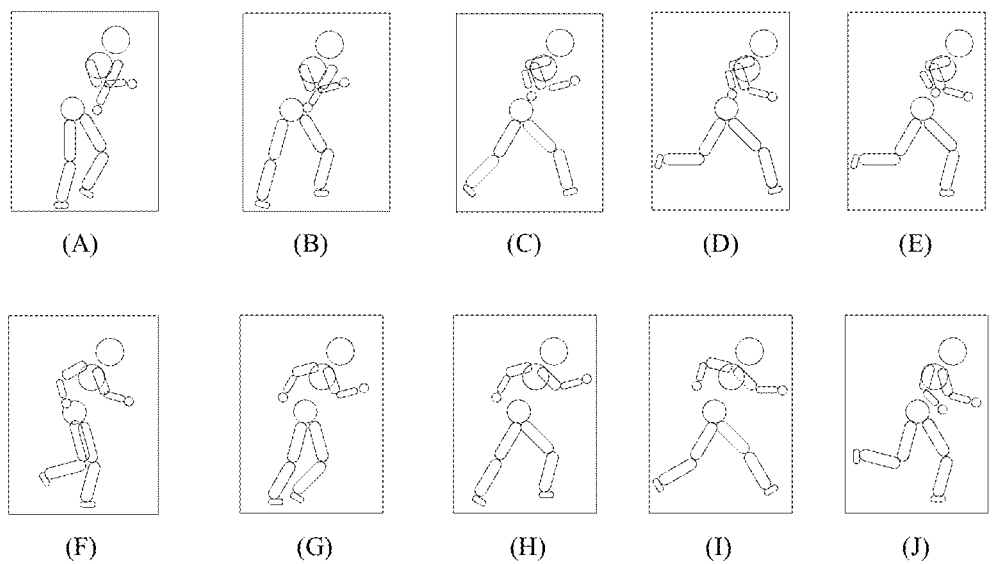
FIG. 14 schematically shows an action sequence of a virtual character controlled by an animation processing model and running on flat ground according to an embodiment of the present disclosure.
Figure 15A:
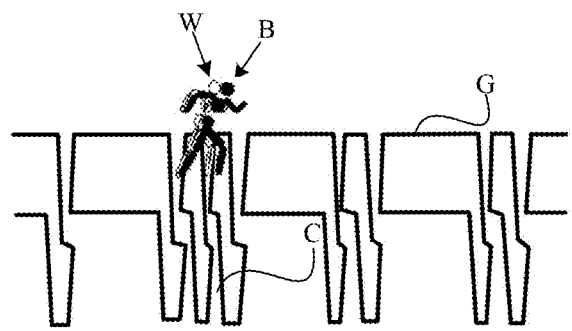
FIG. 15A to FIG. 15E schematically show an action sequence of a human-shaped virtual character running on a densely-notched terrain according to an embodiment of the present disclosure.
Figure 15B:
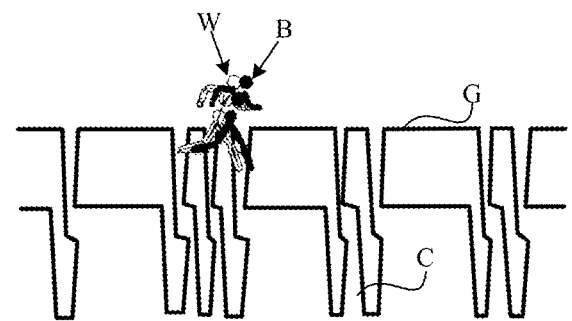
Figure 15C:
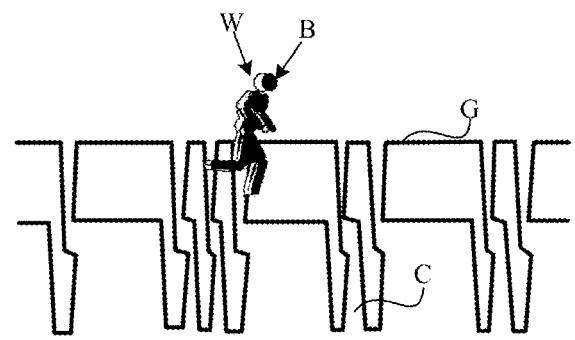
Figure 15D:
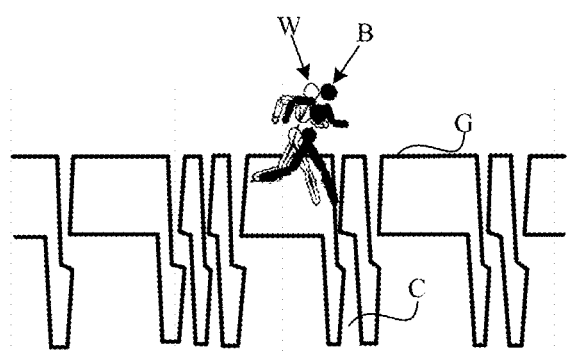
Figure 15E:
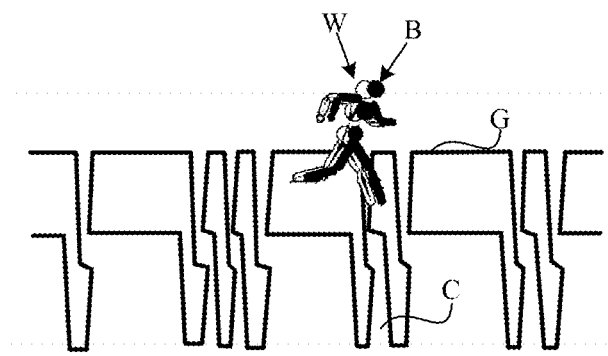

(A) to (J) in FIG. 14 show an action sequence of a virtual character controlled by an animation processing model and running on flat ground. As shown in (A) to (J) in FIG. 14, actions of leg lifting, stepping, foot landing, and arm swinging of the virtual character are more natural and vivid.

FIG. 15A to FIG. 15E show an action sequence of a human-shaped virtual character running on a densely-notched terrain. As shown in FIG. 15A to FIG. 15E, two human-shaped virtual characters are included: a white human-shaped virtual character W and a black human-shaped virtual character B. The white human-shaped virtual character W is a human-shaped virtual character in an original animation segment, and the black human-shaped virtual character B is a human-shaped virtual character controlled by an animation processing model. It can be found from FIG. 15A to FIG. 15E that, actions of the white human-shaped virtual character W and the black human-shaped virtual character B are the same, and there is only a difference of stepping between the white human-shaped virtual character W and the black human-shaped virtual character B in a notch C. The black human-shaped virtual character B controlled by the animation processing model can successfully complete running of the entire a densely-notched terrain G, as shown in FIG. 15A, FIG. 15B, FIG. 15D, and FIG. 15E.

Figure 16A:
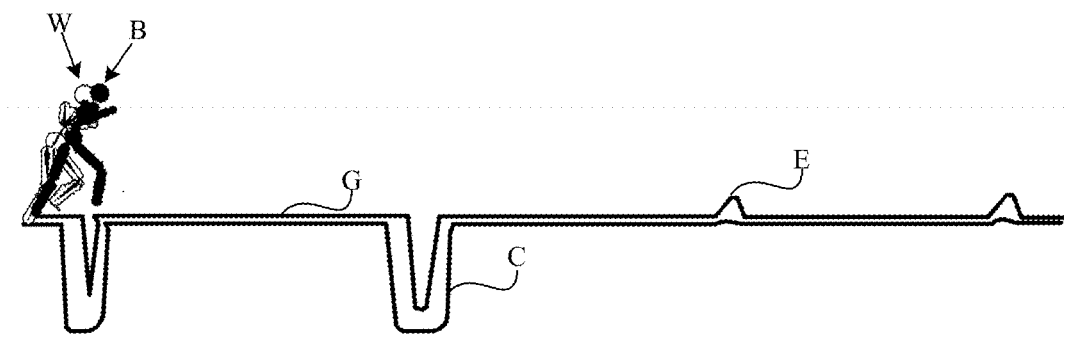
FIG. 16A to FIG. 16L schematically show an action sequence of a human-shaped virtual character running on a hybrid-obstacle terrain according to an embodiment of the present disclosure.
Figure 16B:
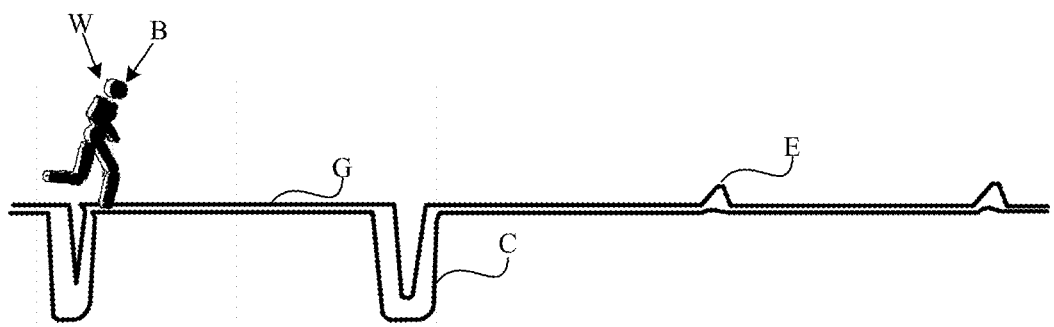
Figure 16C:
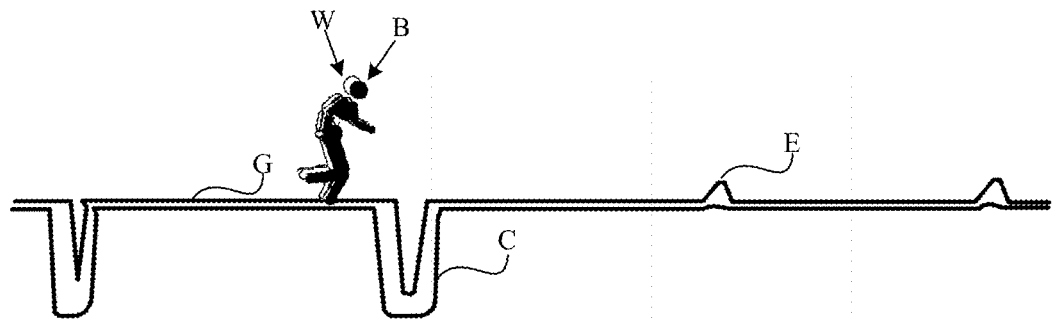
Figure 16D:
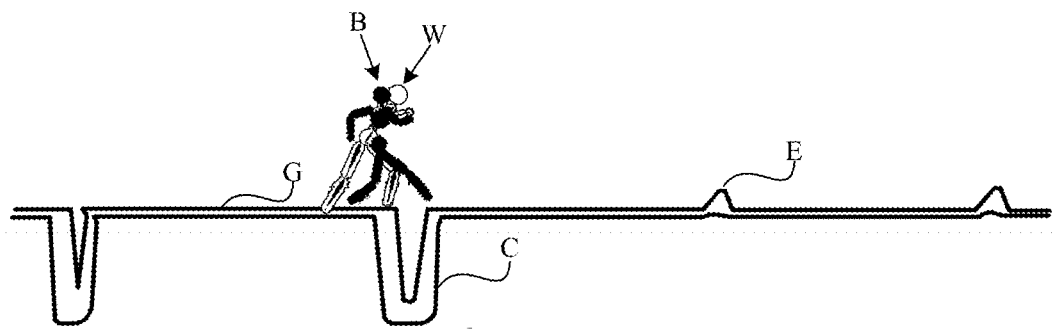
Figure 16E:
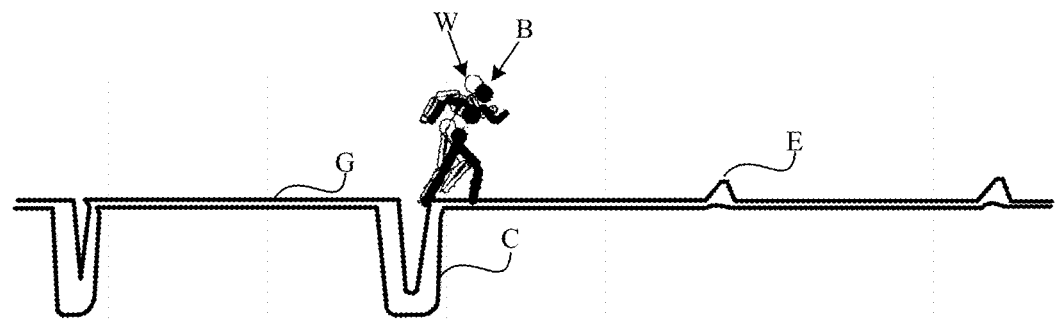
Figure 16F:
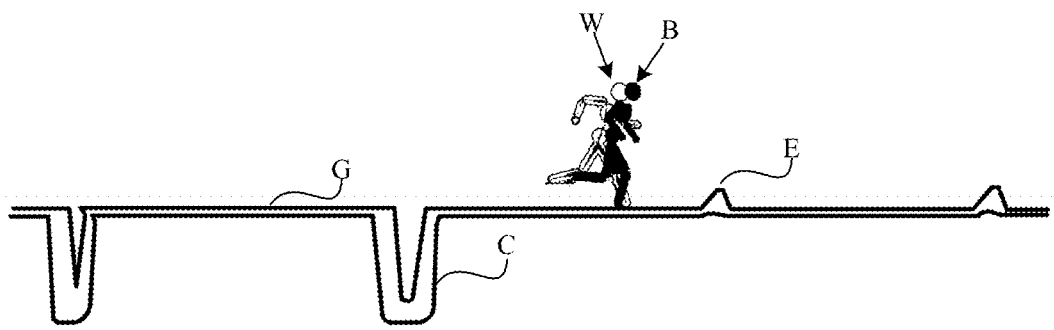
Figure 16G:
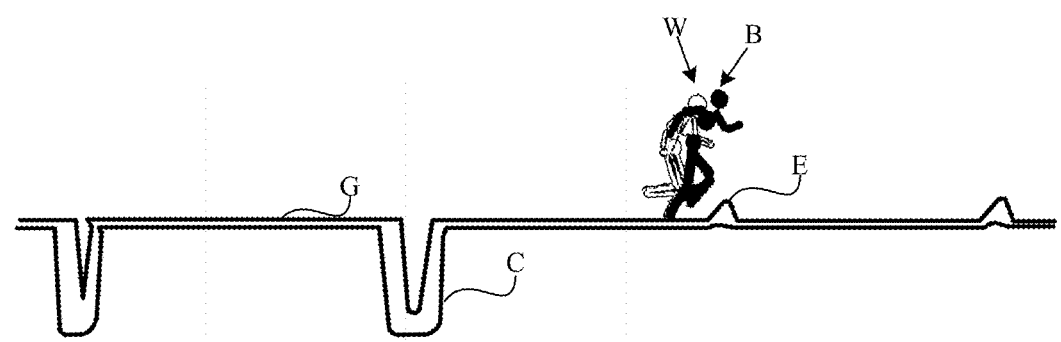
Figure 16H:
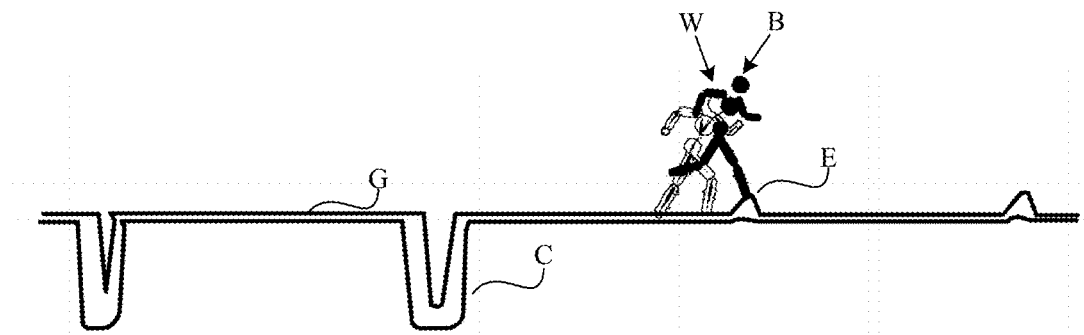
Figure 16I:
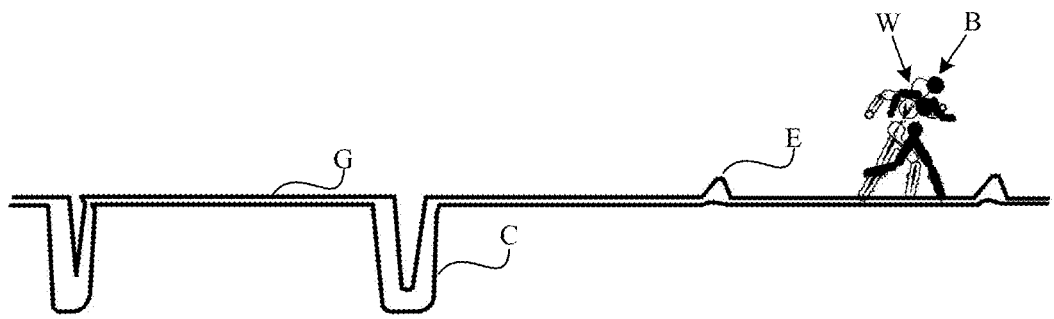
Figure 16J:
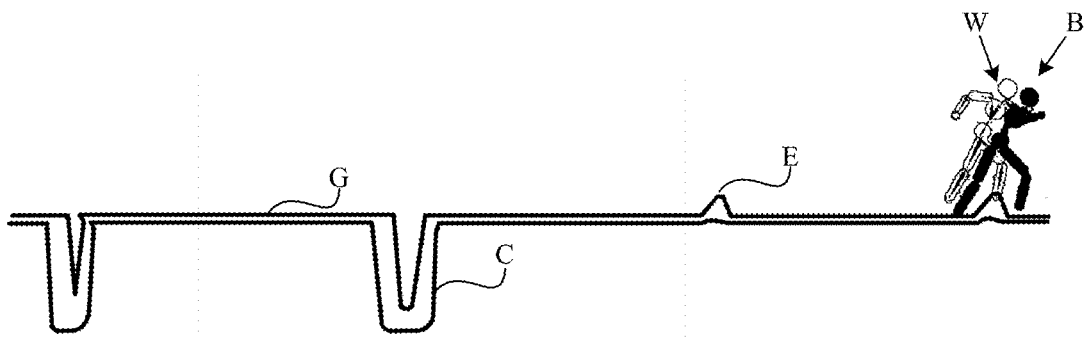
Figure 16K:
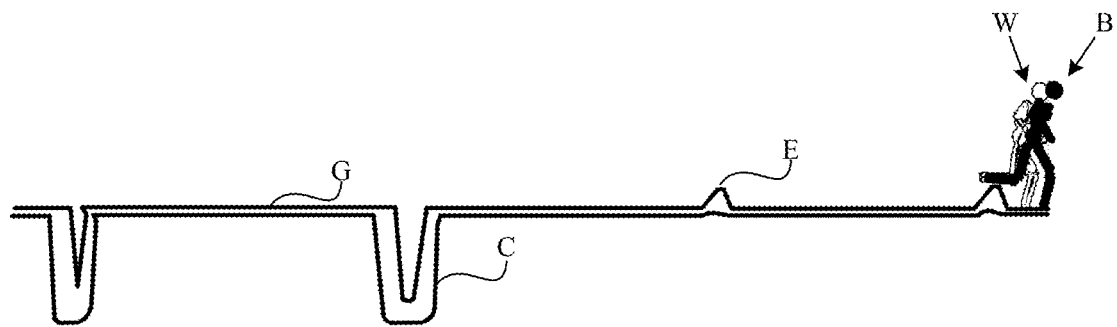
Figure 16L:
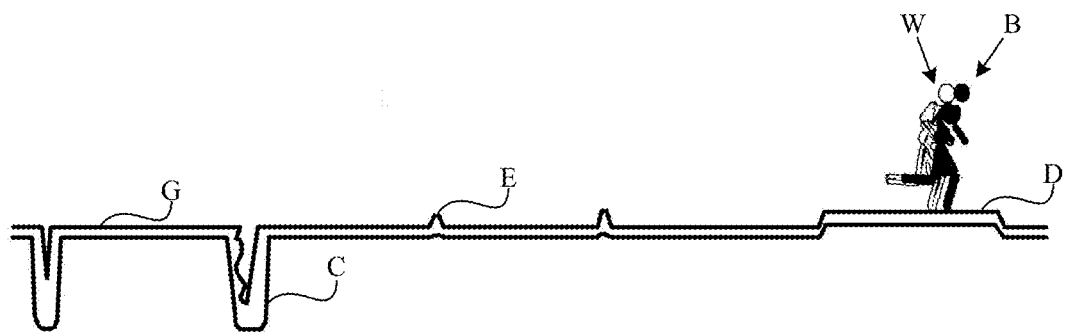

FIG. 16A to FIG. 16L show an action sequence of a human-shaped virtual character running on a hybrid-obstacle terrain. As shown in FIG. 16A to FIG. 16L, ground G of the hybrid-obstacle terrain includes a notch C, a protuberance E, and a step D. Similar to FIG. 15, the figures include a white human-shaped virtual character W in an original animation segment and a black human-shaped virtual character B controlled by an animation processing model. FIG. 16A to FIG. 16E show an action sequence of the human-shaped virtual character crossing a notch, FIG. 16F to FIG. 16K show an action sequence of the human-shaped virtual character crossing a protuberance, and FIG. 16L shows an action sequence of the human-shaped virtual character crossing a step. It can be found that the black human-shaped virtual character B can better cross the notch, the protuberance, and the step, while an effect of running of the white human-shaped virtual character W is poor. For example, feet of the white human-shaped virtual character W may be above the notch or below the protuberance or the step, which has an unreal animation effect.

The animation processing method in the embodiments of the present disclosure may be applicable to any game or animation design that needs a physical animation. According to the animation processing method in the embodiments of the present disclosure, an animation segment designed by an animator may be simulated. During the simulation, an obstacle and a task may be set for a virtual character. Joint action information corresponding to the virtual character at a next moment is determined according to a terrain feature, and task information and state information that correspond to the virtual character at a current moment using an animation processing model. For example, the virtual user lands a left foot and lifts a right foot at the current moment, the terrain feature is that there is a protuberance on a moving path of the virtual user, and the task information is that a speed direction is forward, so that the animation processing model may output joint action information of the virtual character at the next moment according to these pieces of information, to ensure that the virtual character can successfully cross the protuberance after performing actions at a plurality of moments. Finally, a joint torque is determined according to the joint action information, and the joint torque is applied to thighs and feet using a physical engine, to perform rendering to obtain the action of crossing the protuberance by the virtual character.

The animation processing method in the embodiments of the present disclosure may be applicable to game animations of any type. An augmented reality game is used as an example. Based on FIG. 4 showing a schematic diagram of a scene obtained after a game scene and a real scene are integrated, a demon spirit V is a virtual character in the game animation, an environment where the demon spirit is located is steps S in the real scene, and there are a row of electric scooters M behind the demon spirit. According to the animation processing method in the embodiments of the present disclosure, a user may set a task for the demon spirit V, for example, to walk down the steps, or bypass the electric scooters M. According to the state information and the task information of the demon spirit V and the terrain feature in the graphical user interface, a vivid action sequence corresponding to the demon spirit may be obtained. In terms of a visual effect, the demon spirit V can jump to a next step from a current step or can successfully bypass the electric scooters M, and a case in which feet appear below the steps S or the body overlaps the electric scooters M does not happen. Therefore, the action is more vivid and the self-adaptivity to an environment is stronger.

According to the animation processing method in the embodiments of the present disclosure, joint action information at a next moment adjacent to each moment is outputted according to a terrain feature, and state information and task information of a virtual character at each moment using an animation processing model, and a joint torque determined according to the joint action information is applied to a corresponding joint using a physical engine to perform rendering, to obtain a vivid action sequence. An animation effect of an animation generated according to the vivid action sequence is more natural and vivid compared with that of an animation designed by an animator. In addition, during the processing, different terrains and tasks are added, and interaction between a user and a virtual character in a game is implemented, so that the virtual character has self-adaptivity, to improve an ability of the virtual character to perceive the terrains. An action performed by the virtual character on flat ground may be migrated to a complex terrain, to improve interestingness of the game, thereby further improving user experience, and reducing production costs of the game animation.

The following describes apparatus embodiments of the present disclosure, which may be used for performing the animation processing method of the foregoing embodiments of the present disclosure. For details undisclosed in the apparatus embodiments of the present disclosure, reference is made to the foregoing animation processing method in the present disclosure.

Figure 17:
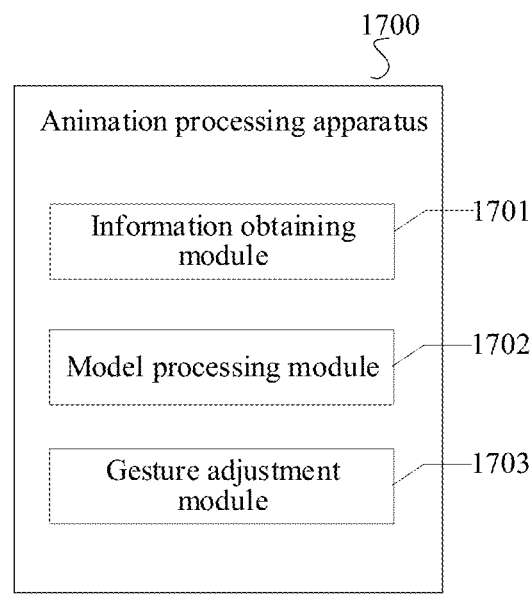
FIG. 17 schematically shows a block diagram of an animation processing apparatus according to an embodiment of the present disclosure.

FIG. 17 schematically shows a block diagram of an animation processing apparatus according to an embodiment of the present disclosure.

Referring to FIG. 17, an animation processing apparatus 1700 according to an embodiment of the present disclosure includes: an information obtaining module 1701, a model processing module 1702, and a gesture adjustment module 1703.

The information obtaining module 1701 is configured to obtain a terrain feature in a graphical user interface at a current moment, and obtain state information and task information that correspond to a virtual character in an animation segment at the current moment. In some embodiments, the graphical user interface includes the virtual character that is to move around in the graphical user interface. The model processing module 1702 is then configured to input the terrain feature, the state information, and the task information to an animation processing model, and perform feature extraction on the terrain feature, the state information, and the task information using the animation processing model, to obtain joint action information corresponding to the virtual character at a next moment. The gesture adjustment module 1703 is configured to determine a joint torque according to the joint action information, obtain gesture adjustment information corresponding to the virtual character from the current moment to the next moment based on the joint torque, and update the animation segment according to the gesture adjustment information to render the updated animation segment in the graphical user interface.

In an embodiment of the present disclosure, the animation processing apparatus 1700 is further configured to: when the current moment is an initial moment of the animation segment, determine the state information according to gesture information of the virtual character at the initial moment of the animation segment; and when the current moment is a non-initial moment of the animation segment, determine the state information according to joint action information corresponding to the virtual character at a previous moment.

In an embodiment of the present disclosure, the animation processing apparatus 1700 is further configured to: obtain gesture adjustment information corresponding to the virtual character at a plurality of moments based on the animation segment; and determine a target action sequence according to the gesture adjustment information at the plurality of moments.

In an embodiment of the present disclosure, the terrain feature is a feature of a self-defined terrain or a feature of a real-life terrain; the state information includes a gesture, a speed, and a phase of each joint of the virtual character; and the task information includes a target speed direction or a target point coordinate corresponding to the virtual character.

In an embodiment of the present disclosure, the animation processing model includes a first control network and a second control network. The model processing module 1702 includes: a first feature extraction unit, configured to input the terrain feature, the state information, and the task information to the first control network, and perform feature extraction on the terrain feature, the state information, and the task information using the first control network, to obtain target state information corresponding to a key joint; and a second feature extraction unit, configured to use the target state information as target task information, input the state information and the target task information to the second control network, and perform feature extraction on the state information and the target task information using the second control network, to obtain the joint action information.

In an embodiment of the present disclosure, the first control network includes a convolution unit, a first fully connected layer, a second fully connected layer, and a third fully connected layer. The first feature extraction unit is configured to: perform feature extraction on the terrain feature using the convolution unit, to obtain first feature information corresponding to a terrain; perform feature combination on the first feature information using the first fully connected layer, to obtain second feature information; perform feature combination on the second feature information, the state information, and the task information using the second fully connected layer, to obtain third feature information; and perform feature combination on the third feature information using the third fully connected layer, to obtain the target state information.

In an embodiment of the present disclosure, the second control network includes a fourth fully connected layer and a fifth fully connected layer. The second feature extraction unit is configured to: perform feature combination on the state information and the target task information using the fourth fully connected layer, to obtain fourth feature information; and perform feature combination on the fourth feature information using the fifth fully connected layer, to obtain the joint action information.

In an embodiment of the present disclosure, the gesture adjustment module 1703 is configured to: determine a current position and a target position of a joint according to the joint action information; determine a current speed and a current acceleration of the joint according to the current position, and determine a target speed of the joint according to the target position; determine a first position and a first speed that correspond to the joint after a next control period according to the current speed and the current acceleration; and calculate the joint torque according to a proportional coefficient, a derivative gain coefficient, the current position, the target position, the target speed, the first position, and the first speed.

In an embodiment of the present disclosure, the gesture adjustment module 1703 is configured to: input the joint torque to a physical engine, apply the joint torque to a corresponding joint using the physical engine, and perform rendering, to generate the gesture adjustment information.

In an embodiment of the present disclosure, the animation processing apparatus 1700 further includes: a training module, configured to, before the feature extraction is performed according to the terrain feature, the state information, and the task information using the animation processing model, train a to-be-trained animation processing model, to obtain the animation processing model.

In an embodiment of the present disclosure, the to-be-trained animation processing model includes a first control network to be trained and a second control network to be trained; the training module includes: a first training unit, configured to obtain a terrain feature sample, a character state sample, and a task information sample, train the first control network to be trained according to the terrain feature sample, the character state sample, and the task information sample, to obtain the first control network; and a second training unit, configured to: train the second control network according to a state information sample corresponding to the key joint of the virtual character and joint action information samples corresponding to all joints in an animation segment sample, to obtain the second control network, where the first control network to be trained and the second control network to be trained are trained separately; and when the first control network to be trained is trained, the first control network to be trained is connected to the second control network with a fixed parameter.

In an embodiment of the present disclosure, the second training unit is configured to: obtain a plurality of animation segment samples, and determine a target animation segment sample from the plurality of animation segment samples according to an initial gesture of the virtual character; obtain a state information sample corresponding to the key joint in the target animation segment sample, and use the state information sample as target task information; obtain the joint action information samples corresponding to all the joints of the virtual character; and train the second control network to be trained according to the target task information and the joint action information samples.

In an embodiment of the present disclosure, the first control network to be trained includes a first to-be-trained actor sub-network and a first to-be-trained critic sub-network, and the second control network to be trained includes a second to-be-trained actor sub-network and a second to-be-trained critic sub-network, where a structure of the first to-be-trained actor sub-network is the same as that of the first to-be-trained critic sub-network, and a structure of the second to-be-trained actor sub-network is the same as that of the second to-be-trained critic sub-network.

Figure 18:
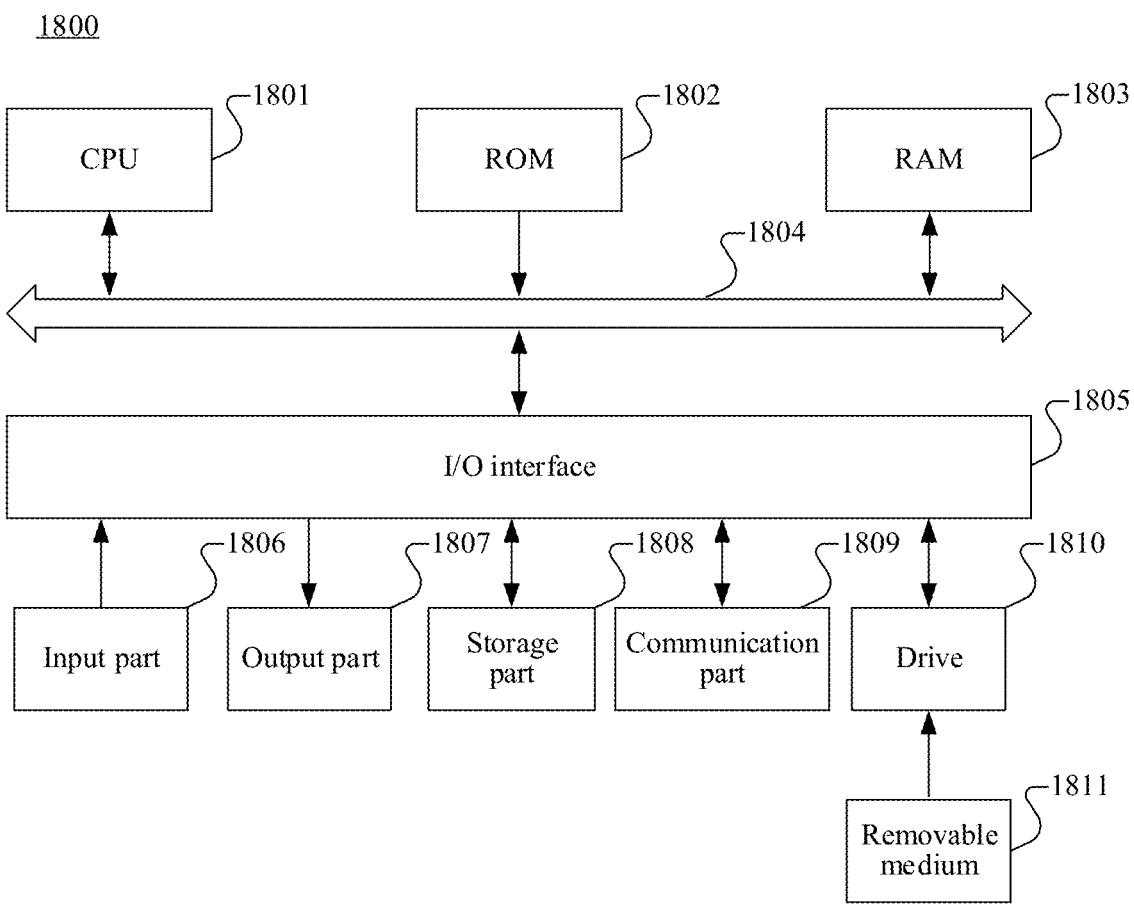
FIG. 18 shows a schematic structural diagram of a computer system of an electronic device adapted to implement embodiments of the present disclosure.

FIG. 18 shows a schematic structural diagram of a computer system of an electronic device adapted to implement embodiments of the present disclosure.

The computer system 1800 of the electronic device shown in FIG. 18 is merely an example and does not bring any limitation to the functions and the use range of the embodiments of the present disclosure.

As shown in FIG. 18, the computer system 1800 includes a central processing unit (CPU) 1801, which may perform various appropriate actions or processing according to a program stored in a read-only memory (ROM) 1802 or a program loaded to a random access memory (RAM) 1803 from a storage part 1808, to implement the animation processing method in the foregoing embodiments. The RAM 1803 further stores various programs and data required for operating the system. The CPU 1801, the ROM 1802, and the RAM 1803 are connected to each other through a bus 1804. An input/output (I/O) interface 1805 is also connected to the bus 1804.

The following components are connected to the I/O interface 1805: an input part 1806 including a keyboard, a mouse, or the like, an output part 1807 including a cathode ray tube (CRT), a liquid crystal display (LCD), a speaker, or the like, a storage part 1808 including a hard disk, or the like, and a communication part 1809 including a network interface card such as a local area network (LAN) card or a modem. The communication part 1809 performs communication processing by using a network such as the Internet. A drive 1810 is also connected to the I/O interface 1805 as required. A removable medium 1811, such as a magnetic disk, an optical disc, a magneto-optical disk, or a semiconductor memory, is installed on the drive 1810 as required, so that a computer program read from the removable medium is installed into the storage part 1808 as required.

Particularly, according to an embodiment of the present disclosure, the processes described in the following by referring to the flowcharts may be implemented as computer software programs. For example, this embodiment of the present disclosure includes a computer program product, the computer program product includes a computer program carried on a computer-readable medium, and the computer program includes program code used for performing the methods shown in the flowcharts. In such an embodiment, by using the communication part 1809, the computer program may be downloaded and installed from a network, and/or installed from the removable medium 1811. When the computer program is executed by the CPU 1801, the various functions defined in the system of this application are executed.

The computer-readable medium shown in the embodiments of the present disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. The computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a specific case.

According to another aspect, the present disclosure further provides a computer-readable medium. The computer-readable medium may be included in the animation processing apparatus described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. In practice, according to the implementations of the present disclosure, the features and functions of two or more modules or units described above may be embodied in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solution according to the embodiments of the present disclosure may be embodied in the form of a software product. The software product may be stored in a non-volatile storage medium (which may be a CD-ROM, a USB flash drive, a removable hard disk, and the like) or on a network, including several instructions to enable a computing device (which may be a personal computer, a server, a touch terminal, a network device, or the like) to perform the method according to the embodiments of the present disclosure.

Other embodiments of the present disclosure will be apparent to a person skilled in the art from consideration of the specification and practice of the disclosure here. The present disclosure is intended to cover any variation, use, or adaptive change of the present disclosure. These variations, uses, or adaptive changes follow the general principles of the present disclosure and include common general knowledge or common technical means, which are not disclosed in the present disclosure, in the technology.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. An animation processing method performed by an electronic device, the method comprising:
   obtaining a terrain feature in a graphical user interface at a current moment, the graphical user interface including a virtual character, and obtaining state information and task information that correspond to the virtual character in an animation segment at the current moment;
   inputting the terrain feature, the state information, and the task information to an animation processing model, and performing feature extraction on the terrain feature, the state information, and the task information using the animation processing model, to obtain joint action information corresponding to the virtual character at a next moment;
   determining a joint torque according to the joint action information; and
   obtaining gesture adjustment information corresponding to the virtual character from the current moment to the next moment based on the joint torque, and updating the animation segment according to the gesture adjustment information to render the updated animated segment in the graphical user interface.

2. The animation processing method according to claim 1, further comprising:
   when the current moment is an initial moment of the animation segment, determining the state information according to gesture information of the virtual character at the initial moment of the animation segment; and
   when the current moment is a non-initial moment of the animation segment, determining the state information according to joint action information corresponding to the virtual character at a previous moment.

3. The animation processing method according to claim 2, further comprising:
   obtaining gesture adjustment information corresponding to the virtual character at a plurality of moments based on the animation segment; and
   determining a target action sequence according to the gesture adjustment information at the plurality of moments.

4. The animation processing method according to claim 1, wherein the terrain feature is a feature of a self-defined terrain or a feature of a real-life terrain;
   the state information comprises a gesture, a speed, and a phase of each joint of the virtual character; and
   the task information comprises a target speed direction or a target point coordinate corresponding to the virtual character.

5. The animation processing method according to claim 1, wherein the animation processing model comprises a first control network and a second control network; and
   the performing feature extraction on the terrain feature, the state information, and the task information using the animation processing model, to obtain joint action information corresponding to the virtual character at a next moment comprises:
      inputting the terrain feature, the state information, and the task information to the first control network, and performing feature extraction on the terrain feature, the state information, and the task information using the first control network, to obtain target state information corresponding to a key joint, the key joint being a joint corresponding to the terrain feature, and the state information and the task information of the virtual character; and
      inputting the state information and the target state information to the second control network, and performing feature extraction on the state information and the target state information using the second control network, to obtain the joint action information.

6. The animation processing method according to claim 5, wherein the first control network comprises a convolution unit, a first fully connected layer, a second fully connected layer, and a third fully connected layer; and
   the performing feature extraction on the terrain feature, the state information, and the task information using the first control network, to obtain target state information corresponding to a key joint comprises:
      performing feature extraction on the terrain feature using the convolution unit, to obtain first feature information corresponding to a terrain;
      performing feature combination on the first feature information using the first fully connected layer, to obtain second feature information;
      performing feature combination on the second feature information, the state information, and the task information using the second fully connected layer, to obtain third feature information; and
      performing feature combination on the third feature information using the third fully connected layer, to obtain the target state information.

7. The animation processing method according to claim 5, wherein the second control network comprises a fourth fully connected layer and a fifth fully connected layer; and
   the performing feature extraction on the state information and the target state information using the second control network, to obtain the joint action information comprises:
      performing feature combination on the state information and the target state information using the fourth fully connected layer, to obtain fourth feature information; and
      performing feature combination on the fourth feature information using the fifth fully connected layer, to obtain the joint action information.

8. The animation processing method according to claim 1, wherein the determining a joint torque according to the joint action information comprises:
   determining a current position and a target position of a joint according to the joint action information;
   determining a current speed and a current acceleration of the joint according to the current position, and a target speed of the joint according to the target position, respectively;
   determining a first position and a first speed that correspond to the joint after a next control period according to the current speed and the current acceleration; and
   calculating the joint torque according to a proportional coefficient, a derivative gain coefficient, the current position, the target position, the target speed, the first position, and the first speed.

9. The animation processing method according to claim 1, wherein the obtaining gesture adjustment information corresponding to the virtual character at the current moment based on the joint torque comprises:
   inputting the joint torque to a physical engine, applying the joint torque to a corresponding joint using the physical engine, and rendering the corresponding joint, to generate the gesture adjustment information.

10. An electronic device, comprising:
one or more processors; and
memory, configured to store one or more computer programs, the one or more computer programs, when executed by the one or more processors, causing the electronic device to perform an animation processing method including:
obtaining a terrain feature in a graphical user interface at a current moment, the graphical user interface including a virtual character, and obtaining state information and task information that correspond to the virtual character in an animation segment at the current moment;
inputting the terrain feature, the state information, and the task information to an animation processing model, and performing feature extraction on the terrain feature, the state information, and the task information using the animation processing model, to obtain joint action information corresponding to the virtual character at a next moment;
determining a joint torque according to the joint action information; and
obtaining gesture adjustment information corresponding to the virtual character from the current moment to the next moment based on the joint torque, and updating the animation segment according to the gesture adjustment information to render the updated animated segment in the graphical user interface.

11. The electronic device according to claim 10, wherein the animation processing method further include:
when the current moment is an initial moment of the animation segment, determining the state information according to gesture information of the virtual character at the initial moment of the animation segment; and
when the current moment is a non-initial moment of the animation segment, determining the state information according to joint action information corresponding to the virtual character at a previous moment.

12. The electronic device according to claim 11, wherein the animation processing method further include:
obtaining gesture adjustment information corresponding to the virtual character at a plurality of moments based on the animation segment; and
determining a target action sequence according to the gesture adjustment information at the plurality of moments.

13. The electronic device according to claim 10, wherein the terrain feature is a feature of a self-defined terrain or a feature of a real-life terrain;
the state information comprises a gesture, a speed, and a phase of each joint of the virtual character; and
the task information comprises a target speed direction or a target point coordinate corresponding to the virtual character.

14. The electronic device according to claim 10, wherein the animation processing model comprises a first control network and a second control network; and
the performing feature extraction on the terrain feature, the state information, and the task information using the animation processing model, to obtain joint action information corresponding to the virtual character at a next moment comprises:
inputting the terrain feature, the state information, and the task information to the first control network, and performing feature extraction on the terrain feature, the state information, and the task information using the first control network, to obtain target state information corresponding to a key joint, the key joint being a joint corresponding to the terrain feature, and the state information and the task information of the virtual character; and
inputting the state information and the target state information to the second control network, and performing feature extraction on the state information and the target state information using the second control network, to obtain the joint action information.

15. The electronic device according to claim 10, wherein the determining a joint torque according to the joint action information comprises:
determining a current position and a target position of a joint according to the joint action information;
determining a current speed and a current acceleration of the joint according to the current position, and a target speed of the joint according to the target position, respectively;
determining a first position and a first speed that correspond to the joint after a next control period according to the current speed and the current acceleration; and
calculating the joint torque according to a proportional coefficient, a derivative gain coefficient, the current position, the target position, the target speed, the first position, and the first speed.

16. The electronic device according to claim 10, wherein the obtaining gesture adjustment information corresponding to the virtual character at the current moment based on the joint torque comprises:
inputting the joint torque to a physical engine, applying the joint torque to a corresponding joint using the physical engine, and rendering the corresponding joint, to generate the gesture adjustment information.

17. A non-transitory computer-readable storage medium, storing one or more computer programs, the one or more computer programs, when executed by one or more processors of an electronic device, causing the electronic device to perform an animation processing method including:
obtaining a terrain feature in a graphical user interface at a current moment, the graphical user interface including a virtual character, and obtaining state information and task information that correspond to the virtual character in an animation segment at the current moment;
inputting the terrain feature, the state information, and the task information to an animation processing model, and performing feature extraction on the terrain feature, the state information, and the task information using the animation processing model, to obtain joint action information corresponding to the virtual character at a next moment;
determining a joint torque according to the joint action information; and
obtaining gesture adjustment information corresponding to the virtual character from the current moment to the next moment based on the joint torque, and updating the animation segment according to the gesture adjustment information to render the updated animated segment in the graphical user interface.

18. The non-transitory computer-readable storage medium according to claim 17, wherein the animation processing method further include:
when the current moment is an initial moment of the animation segment, determining the state information according to gesture information of the virtual character at the initial moment of the animation segment; and when the current moment is a non-initial moment of the animation segment, determining the state information according to joint action information corresponding to the virtual character at a previous moment.

19. The non-transitory computer-readable storage medium according to claim 18, wherein the animation processing method further include:

obtaining gesture adjustment information corresponding to the virtual character at a plurality of moments based on the animation segment; and determining a target action sequence according to the gesture adjustment information at the plurality of moments.

20. The non-transitory computer-readable storage medium according to claim 17, wherein the obtaining gesture adjustment information corresponding to the virtual character at the current moment based on the joint torque comprises:

inputting the joint torque to a physical engine, applying the joint torque to a corresponding joint using the physical engine, and rendering the corresponding joint, to generate the gesture adjustment information.

\* \* \* \* \*